(12) United States Patent
Hunnicutt

(10) Patent No.: US 6,694,998 B1
(45) Date of Patent: Feb. 24, 2004

(54) MICROMACHINED STRUCTURE USABLE IN PRESSURE REGULATING MICROVALVE AND PROPORTIONAL MICROVALVE

(75) Inventor: Harry A. Hunnicutt, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 305 days.

(21) Appl. No.: 09/919,407

(22) Filed: Jul. 31, 2001

Related U.S. Application Data

(63) Continuation-in-part of application No. 09/532,604, filed on Mar. 22, 2000.

(51) Int. Cl.$^7$ .............................................. G05D 11/00
(52) U.S. Cl. ................................ 137/116.3; 137/625.25
(58) Field of Search .......................... 137/116.3, 625.25

(56) References Cited

U.S. PATENT DOCUMENTS

| | | |
|---|---|---|
| 4,434,813 A | 3/1984 | Mon |
| 4,581,624 A | 4/1986 | O'Connor |

(List continued on next page.)

FOREIGN PATENT DOCUMENTS

| | | |
|---|---|---|
| DE | 4101575 | 7/1992 |
| DE | 4417251 | 11/1995 |
| DE | 4422942 | 1/1996 |
| EP | 0250948 | 1/1988 |
| EP | 0261972 | 3/1988 |
| WO | WO 99/16096 | 4/1999 |
| WO | WO 00/14415 | 3/2000 |
| WO | WO 01/71226 A2 | 9/2001 |
| WO | WO 01/98688 A2 | 12/2001 |

OTHER PUBLICATIONS

IEEE Technical Digest entitled "Compliant Electro–thermal Microactuator", J. Jonsmann, O. Sigmund, S. Bouwstra, Twelfth IEEE International Conference on Micro Electro Mechanical Systems held Jan. 17–21, 1999, Orlando, Florida, pp. 588–593, IEEE Catalog No.: 99CH36291C.

(List continued on next page.)

*Primary Examiner*—Edward K. Look
*Assistant Examiner*—John K Fristoe, Jr.
(74) *Attorney, Agent, or Firm*—MacMillan, Sobanski & Todd, LLC

(57) ABSTRACT

A microvalve device includes a first plate, a second plate and a third plate. The second plate is connected between the first plate and the third plate. The second plate contains a stationary element and a moveable plate valve slider element. The slider element variably restricts the flow of a fluid through the microvalve device. The second plate defines a first supply port, an output conduit, and a return port. In a pressure increase position, the slider element allows the fluid to flow from the first supply port to the output conduit. In a pressure hold position, the slider element isolates the output conduit from both the first supply port and the return port. The pressure decrease position allows fluid to flow from the output conduit to the return port. Pressure from the output conduit acts against a first axial end face of the slider element. In a pressure regulating valve embodiment of the microvalve device, the second axial end face of the slider element (opposite the first axial end face) is acted upon by a spring, with the position of the slider element being determined by a balancing of the force exerted by the spring and the force exerted by the fluid acting against the first axial end face. In a proportional microvalve embodiment of the microvalve device, the second axial end face of the slider element (opposite the first axial end face) is acted upon by pressurized fluid in a control chamber, with the position of the slider element being determined by a balancing of the force exerted by the fluid acting against the first axial end face and the force exerted by the fluid acting against the second axial end face. Preferably, a buffer piston extends axially from the first axial end face.

43 Claims, 12 Drawing Sheets

U.S. PATENT DOCUMENTS

| | | |
|---|---|---|
| 4,628,576 A | 12/1986 | Giachino et al. |
| 4,647,013 A | 3/1987 | Giachino et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,869,282 A | 9/1989 | Sittler et al. |
| 4,872,472 A * | 10/1989 | Lefevre et al. .......... 137/116.3 |
| 4,938,742 A | 7/1990 | Smits |
| 4,943,032 A | 7/1990 | Zdeblick |
| 4,959,581 A | 9/1990 | Dantlgraber |
| 4,966,646 A | 10/1990 | Zdeblick |
| 5,029,805 A | 7/1991 | Albarda et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,216,273 A | 6/1993 | Doering et al. |
| 5,217,283 A | 6/1993 | Watanabe |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,325,880 A | 7/1994 | Johnson et al. |
| 5,333,831 A | 8/1994 | Barth et al. |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,566,703 A | 10/1996 | Watanabe et al. |
| 5,785,295 A | 7/1998 | Tsai |
| 5,909,078 A | 6/1999 | Wood et al. |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,114,794 A | 9/2000 | Dhuler et al. |
| 6,171,972 B1 | 1/2001 | Mehregany et al. |

OTHER PUBLICATIONS

"A Silicon Microvalve For The Proportional Control Of Fluids" by K.R. Williams, N.I. Maluf, E.N. Fuller, R.J. Barron, D.P. Jaeggi, and B.P. van Drieënhuizen, TRANSDUCERS '99, Proc. 10$^{th}$ International Conference on Solid State Sensors and Actuators, held Jun. 7–10, 1999, Sendai, Japan, pp. 18–21.

Noworolski et al., "Process for in–plane and out–of–plane single–crystal–silicon thermal microactuators," Sensors and Actuators A, Elsevier Science S.A., vol. 55, No. 1, (1996) 65–69.

Ayón et al., "Etching Characteristics and Profile Control in a Time Multiplexed ICP Etcher," Proc. Of Solid State Sensor and Actuator Workshop Technical Digest, Hilton Head SC, (Jun. 1998) 41–44.

Bartha et al., "Low Temperature Etching of Si in High Density Plasma Using $SF_6/O_2$," Microelectronic Engineering, Elsevier Science B.V., vol. 27, (1995) 453–456.

Fung et al., "Deep Etching of Silicon Using Plasma" Proc. Of the Workshop on Micromachining and Micropackaging of Transducers, (Nov. 7–8, 1984) 159–164.

Klaassen et al., "Silicon Fusion Bonding and Deep Reactive Ion Etching; A New Technology for Microstructures," Proc., Transducers 95 Stockholm Sweden, (1995) 556–559.

Linder et al., "Deep Dry Etching Techniques as a New IC Compatible Tool for Silicon Micromachining," Proc,. Transducers, vol. 91, (Jun. 1991) 524–527.

Petersen et al., "Surfaced Micromachined Structures Fabricated with Silicon Fusion Bonding," Proc. Transducers, vol. 91, (Jun. 92) 397–399.

Yunkin et al., "Highly Anisotropic Selective Reactive Ion Etching of Deep Trenches in Silicon," Microelectronic Enginineering, Elsevier Science B.V., vol. 23, (1994) 373–376.

Marc Madou, "Fundamentals of Microfabrication", copyright 1997 by CRC Press LLC, pp. 405–446.

Ohio State University Chemistry Department brochure page on Marc J. Madou [online]. Ohio State University [retrieved on Dec. 31, 2000]. Retrieved from the Internet: <URL: http://www.chemistry.ohio–state.edu/resource/pubs/brochure/madou.htm>.

University of Califronia Irvine brochure page on Marc J. Madou [online]. University of California [retrieved on Aug. 7, 2003]. Retreived from the Internet: <URL: http://mmadou.eng.uci.edu/MadouBio/ShortBio.html>.

* cited by examiner

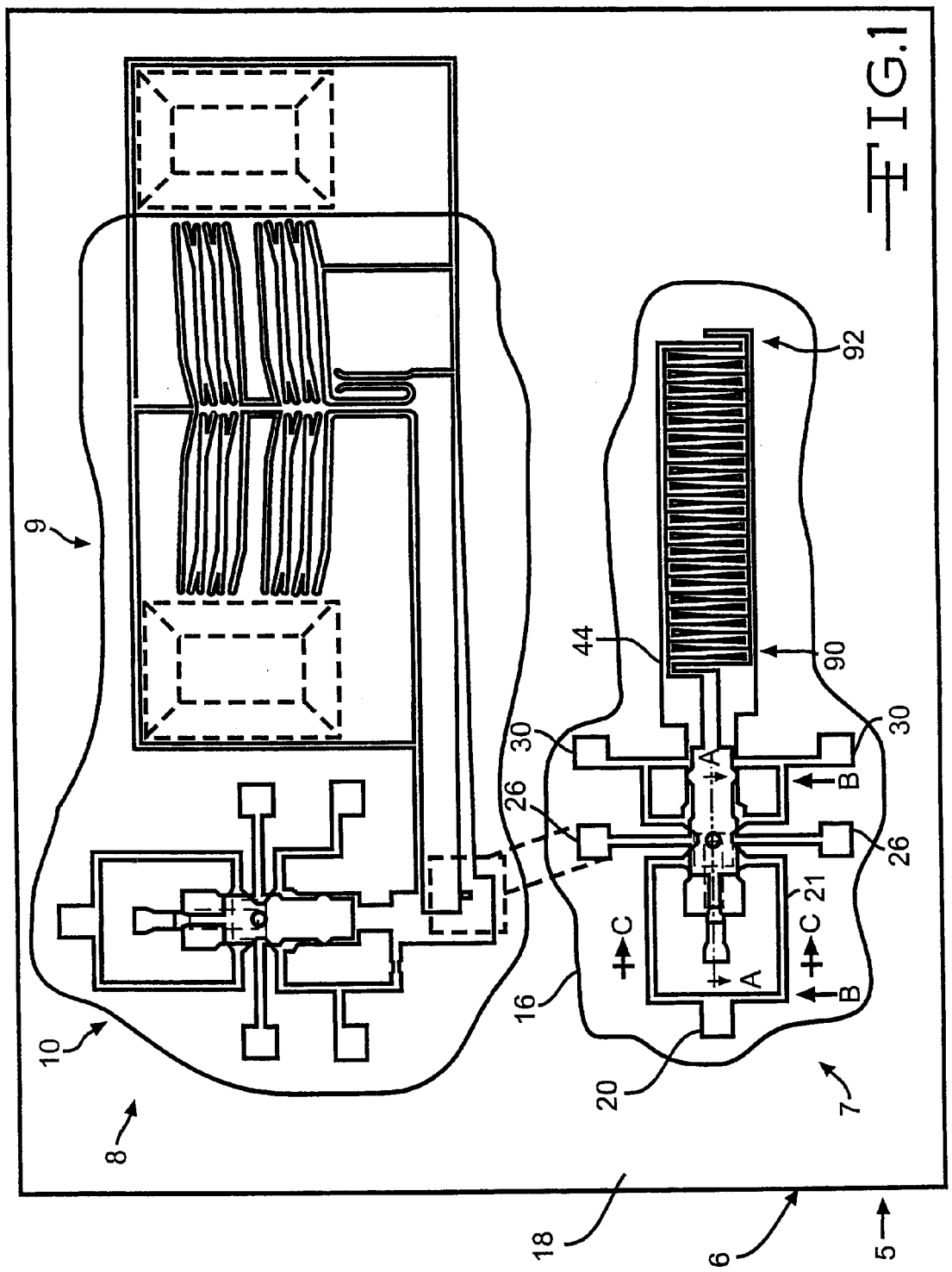

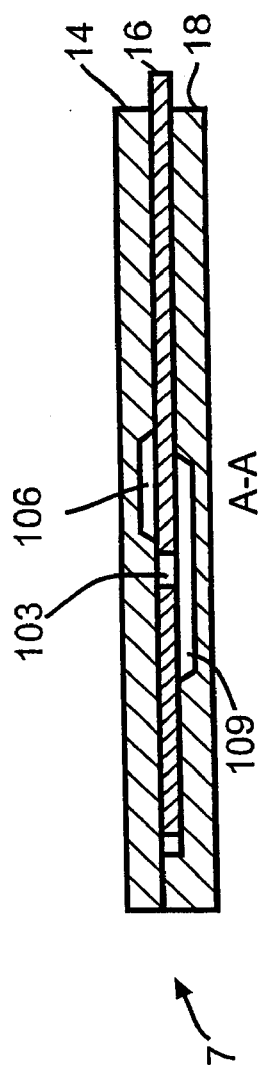
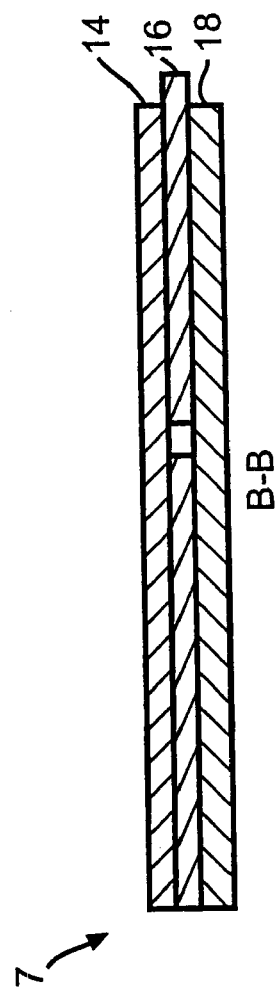
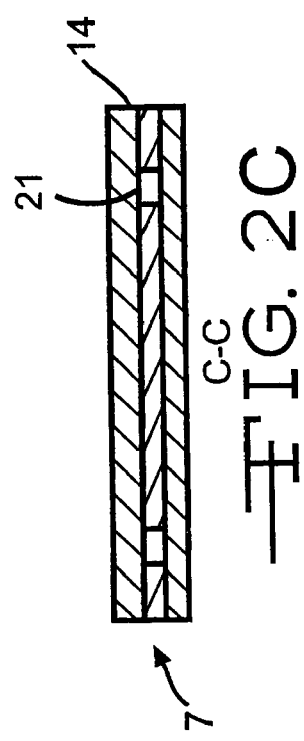

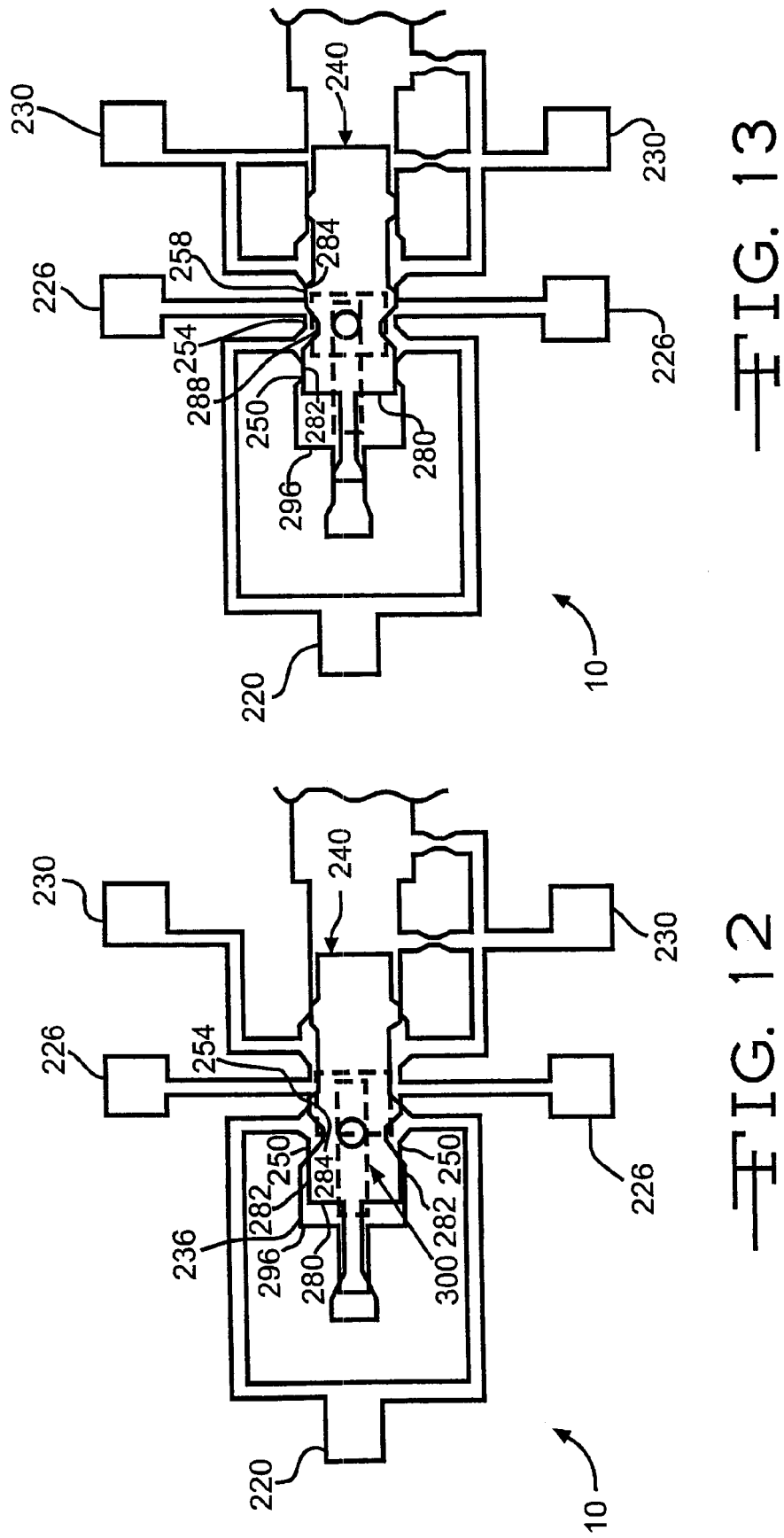

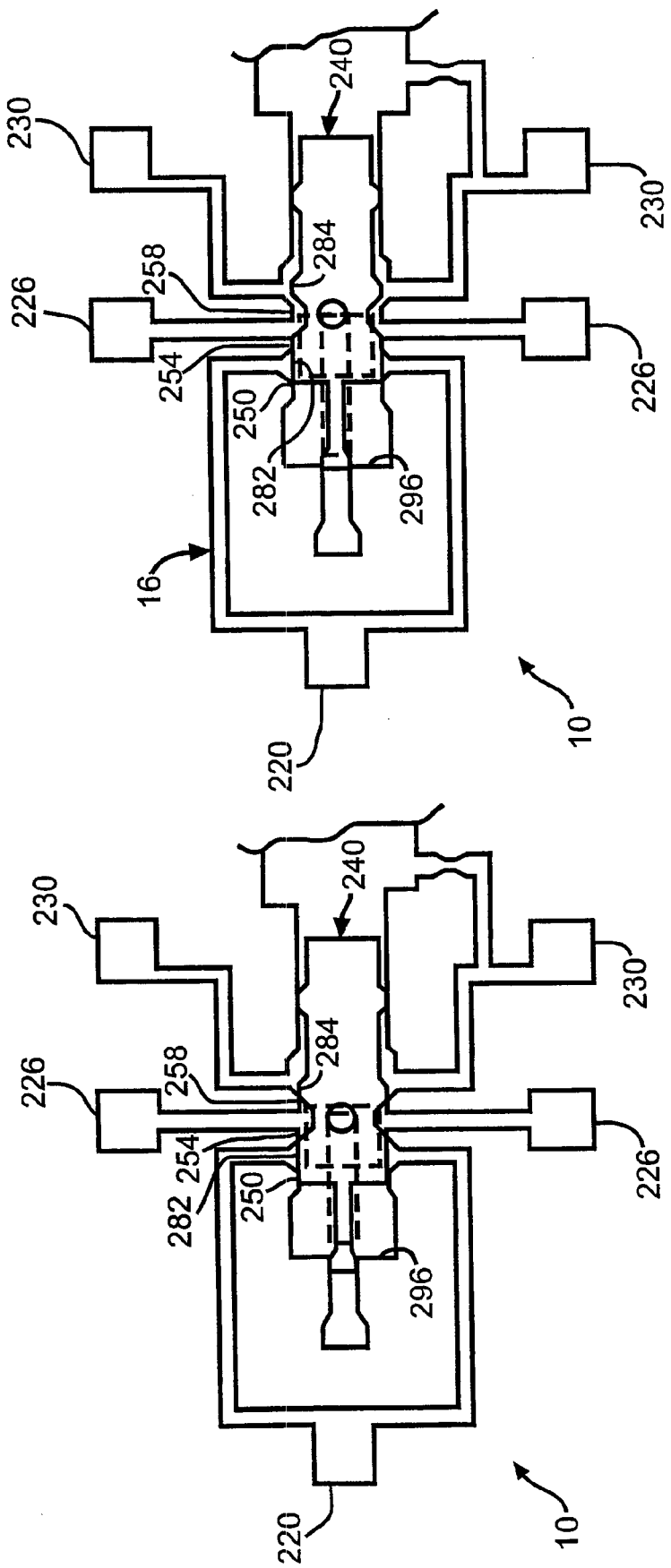

MICROMACHINED STRUCTURE USABLE IN PRESSURE REGULATING MICROVALVE AND PROPORTIONAL MICROVALVE

CROSS-REFERENCE TO RELATED APPLICATIONS

This application is a Continuation-In-Part of co-pending application Ser. No. 09/532,604, filed Mar. 22, 2000.

BACKGROUND OF THE INVENTION

This invention relates in general to microelectromechanical devices, and in particular to a microvalve device having a micromachined structure suitable for use in such devices as pressure regulating microvalve and a proportionally controlled microvalve.

MEMS (MicroElectroMechanical Systems) is a class of systems that are physically small, having features with sizes in the micrometer range. The scope of the invention is not limited by the way in which the system is produced. These systems may have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or macro sized (larger) components.

Various microvalve devices have been proposed for controlling fluid flow within a fluid circuit. A typical microvalve device includes a displaceable member movably supported by a body and operatively coupled to an actuator for movement between a closed position and a fully open position. When placed in the closed position, the displaceable member blocks or closes a first fluid port that is placed in fluid communication with a second fluid port, thereby preventing fluid from flowing between the fluid ports. When the displaceable member moves from the closed position to the fully open position, fluid is increasingly allowed to flow between the fluid ports.

A typical microvalve device also typically includes a spring element that urges the displaceable member toward one of the open position (in a normally open microvalve) or the closed position (in a normally closed microvalve). The spring element may be separate from the displaceable member, or may be an integral part of the displaceable member which is distorted under the urging of the actuator, with the distorted portion developing a force resisting the actuator and urging the displaceable member back toward the position in which the spring element is undistorted (or is least distorted). For example, U.S. Pat. No. 4,821,997 to Zdeblick describes a type of microvalve in which the actuator for the displaceable member consists of a fluid with a sealed cavity having a thin wall. When the fluid is heated, the fluid expands, and the thin wall bulges outwardly. The thin wall is disposed adjacent a valve seat in a fluid passageway and, as the wall is distorted toward the valve seat, controls the flow of a fluid through the valve seat. The wall also acts as a spring element, due to it's elastic deformation, developing a force urging the wall back toward its undistorted (non-bulging) position.

In operation, the actuator forces the displaceable member to move toward the position opposite to the position the spring element is urging the displaceable member toward. The actuator must generate a force sufficient to overcome the spring force associated with the displaceable member. As a general rule, the output force required by the actuator to move the displaceable member against the spring element increases as the displacement of the displaceable member increases.

In addition to generating a force sufficient to overcome the spring force associated with the spring element, the actuator must generate a force capable of overcoming the fluid flow forces acting on the displaceable member that oppose the intended displacement of the displaceable member. These fluid flow forces generally increase as the flow rate through the fluid ports increases.

As such, the output force requirement of the actuator and in turn the size of the actuator and the power required to drive the actuator generally must increase as the displacement requirement of the displaceable member increases and/or as the flow rate requirement through the fluid ports increases.

Accordingly, there is a need for a microvalve device capable of controlling relatively large flow rates and/or having a displaceable member capable of relatively large displacements with a relatively compact and low powered actuator.

SUMMARY OF THE INVENTION

The apparatus of the invention includes a microvalve device having a first plate, a second plate and a third plate. The second plate is connected between the first plate and the third plate. The second plate contains a stationary element and a moveable plate valve slider element. The slider element variably restricts the flow of a fluid through the microvalve device. The second plate defines a first supply port, an output conduit, and a return port. In a pressure increase position, the slider element allows the fluid to flow from the first supply port to the output conduit. In a pressure hold position, the slider element isolates the output conduit from both the first supply port and the return port. The pressure decrease position allows fluid to flow from the output conduit to the return port. Pressure from the output conduit acts against a first axial end face of the slider element. Preferably, a buffer piston extends axially from the first axial end face to dampen movement of the slider element and to act as a bearing to laterally support the slider element. In a pressure regulating valve embodiment of the microvalve device, the second axial end face of the slider element (opposite the first axial end face) is acted upon by a spring, with the position of the slider element being determined by a balancing of the force exerted by the spring and the force exerted by the fluid acting against the first axial end face. In a proportional microvalve embodiment of the microvalve device, the second axial end face of the slider element (opposite the first axial end face) is acted upon by pressurized fluid in a control chamber, with the position of the slider element being determined by a balancing of the force exerted by the fluid acting against the first axial end face and the force exerted by the fluid acting against the second axial end face. The pressure in the control chamber is preferably controlled by a pilot microvalve, so that the slider element forms a pilot operated microvalve.

BRIEF DESCRIPTION OF THE DRAWINGS

FIG. 1 is a top plan view of a microvalve device according to the invention, with a first plate thereof removed to allow viewing of a second plate and portions of a third plate.

FIG. 2a is a cross-sectional view of a pressure regulating microvalve illustrated in FIG. 1 viewed along line A—A of FIG. 1, showing the first, second, and third plates.

FIG. 2b is a cross-sectional view of the pressure regulating microvalve illustrated in FIG. 1 viewed along line B—B of FIG. 1.

FIG. 2c is a cross-sectional view of the pressure regulating microvalve illustrated in FIG. 1 viewed along line C—C of FIG. 1.

FIG. 12 is a top plan view of the pilot operated microvalve illustrated in FIG. 1, with the first plate removed, showing the pilot operated microvalve in a second intermediate position.

FIG. 13 is a top plan view of the pilot operated microvalve illustrated in FIG. 1, with the first plate removed, showing the pilot operated microvalve in a pressure increase position.

FIG. 14 is a top plan view of the pilot operated microvalve illustrated in FIG. 1, with the first plate removed, showing the pilot operated microvalve in a pressure hold position.

FIG. 15 is a top plan view of the pilot operated microvalve illustrated in FIG. 1, with the first plate removed, showing the pilot operated microvalve in a pressure decrease position.

DETAILED DESCRIPTION OF THE INVENTION

Figure 3:
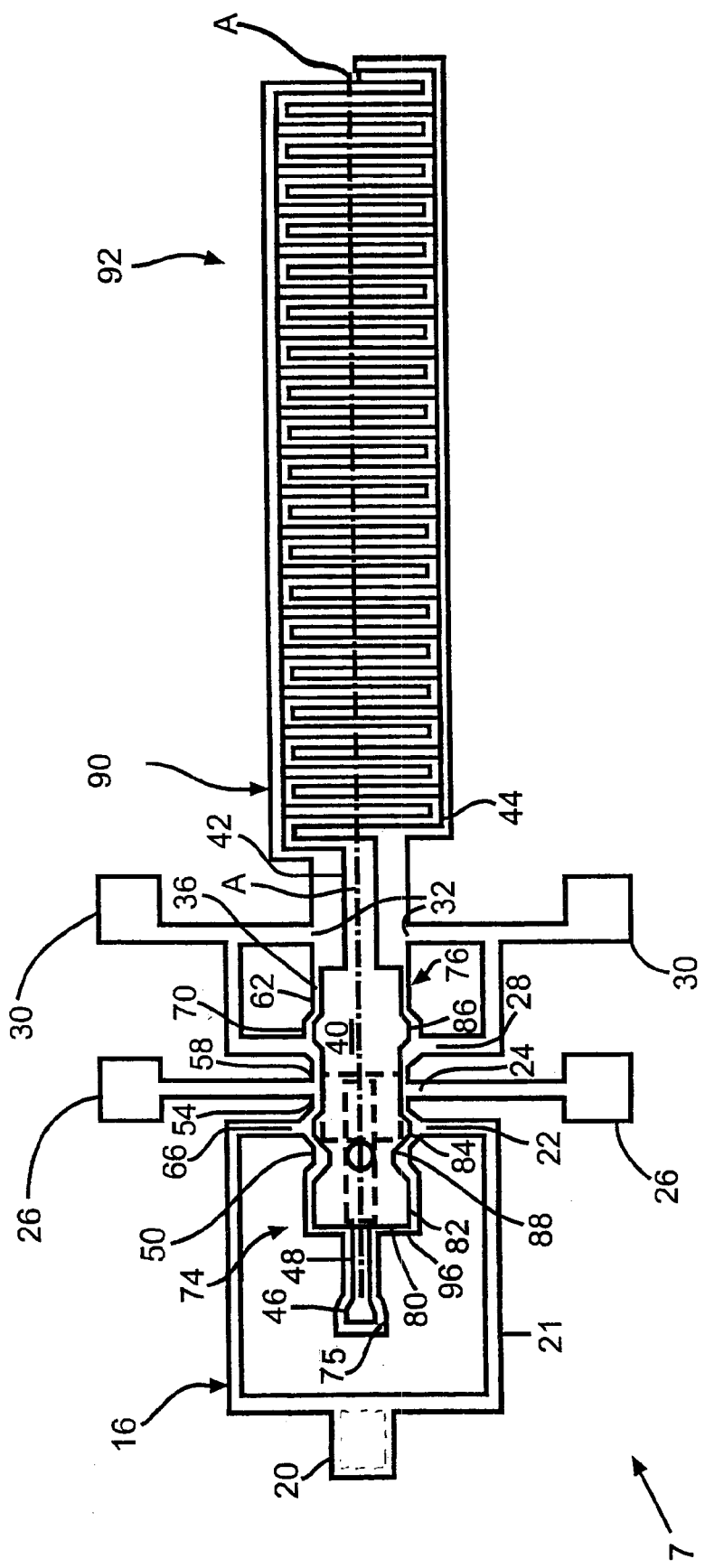
FIG. 3 is a top plan view of the pressure regulating microvalve illustrated in FIG. 1, with the first plate removed, showing the pressure regulating microvalve in an as-fabricated position.

Preliminarily, it should be noted that certain terms used herein, such as "upper", "lower", "top", "bottom", "front", "back", and "side", are used to facilitate the description of the preferred embodiment of the invention. Unless otherwise specified or made apparent by the context of the discussion, such terms should be interpreted with reference to the figure under discussion. Such terms are not intended as a limitation on the position in which the components of the invention may be used.

It is proposed to make an inventive micromachined structure that may be used in microvalves. By way of illustration and not limitation, two microvalves are illustrated and described which utilize the inventive micromachined structure: a pressure regulating microvalve and a proportional microvalve. The proportional microvalve is preferably provided with a source of pressurized fluid which is regulated. The proportional microvalve is preferably designed and operated to accommodate relatively high flow rates of fluid therethrough at relatively high pressures.

Referring to FIG. 1, a microvalve device is illustrated and indicated generally at 5. The microvalve device 5 includes a body, indicated generally at 6. Defined within the body 6 are two microvalves constructed according to the invention: a pressure regulating microvalve, indicated generally at 7, and a proportional microvalve, indicated generally at 8. The proportional microvalve 8 includes a pilot microvalve 9 and a pilot operated microvalve 10, each of which will be described in greater detail below.

Referring to FIGS. 2a, 2b, and 2c, the body 6 includes first, second and third plates 14, 16 and 18, respectively. The second plate 16 is attached to and between the first plate 14 and the third plate 18. Preferably, each plate 14, 16, 18 is made of semiconductor material, such as polycrystalline silicon or single crystal silicon. Alternatively, the plates 14, 16, 18 may be made of any other suitable material, such as glass, ceramic, aluminum, or the like.

The components of the pressure regulating microvalve 7 and the proportional microvalve 8, and the connections thereto, are formed by the plates 14, 16, and 18 by any suitable means, including selective etching, laser cutting, etc. One particularly suitable process is deep reactive ion etching, which is described in, for example, U.S. Pat. No. 6,171,972, the disclosure of which is incorporated herein by reference.

It should be understood that the term "fluid volume" as used in this application merely means a quantity of fluid. The fluid volume may be at a relatively "high pressure", such as the discharge of a running pump, in which case fluid will tend to flow from that fluid volume to the area of interest. Alternatively, the fluid may be of relatively "low pressure", such as the suction of a running pump, in which case the fluid will tend to flow from the area of interest to the fluid volume. The term "non-planar" as used in this application means that the fluid flow, force, or other subject of the term has a significant component acting perpendicular to the parallel planes defined by the plates 14, 16, and 18, best seen in FIGS. 2a, 2b, and 2c. Other terms which may be used in this application include upper, lower, above, below, up, down and the like. These terms are defined in this application with respect to an arbitrary frame work in which the direction perpendicular to the second plate 16 toward the first plate 14 is defined as "down" and the direction perpendicular to the second plate 16 toward the third plate 18 is defined as "up". This convention is for ease of discussion and is not intended as a limitation to the orientation of the devices described herein in actual use or as a limitation to the claims. The terms "inner" and "outer" are defined with respect to the relative closeness of the component under discussion to the longitudinal axis generally defined by the assembly (generally a microvalve) under discussion, with an inner component being relatively closer to the axis than an outer component.

In this disclosure, reference may sometimes made to a microvalve being "closed" or a port, conduit or like structure being "covered" or "blocked" or "restricted." It should be understood that these terms are understood to include that the flow through the structure is reduced sufficiently that any leakage flow remaining will be relatively minor in applications in which the microvalve devices described herein should be employed.

Referring to the pressure regulating microvalve 7 illustrated in FIG. 3, the second plate 16 defines a first supply port 20 in fluid communication with a front conduit 21. The pressure regulating microvalve 7 is symmetrical about a longitudinal axis "A". The conduit 21 is actually generally C-shaped with the port 20 connecting to the middle of the conduit 21. Each end of the conduit 21 terminates at a respective one of a pair of opposed ports 22. As will be appreciated from the following discussion and reference to the drawings, the pressure regulating microvalve 7 is constructed with bilateral symmetry ports, protrusions, and other features to balance the fluid force acting thereon. Unless otherwise specifically noted, any feature which is described as being one of a pair will have the other of the pair symmetrically located on the opposite side of the axis "A" (these features may also be referred to as being "opposed", which should be taken to mean that these features are bilaterally symmetric features, unless another meaning is clear from the specific discussion and illustrations of that discussion in the drawings). Indeed, for reasons of succinctness, the discussion may refer to only one of a pair of bilaterally symmetrical features illustrated in the Figures. It should be assumed, unless it specifically noted otherwise, that the discussion of the arrangement and function of one of a pair of illustrated features, whether or not specifically called out as being one of a pair of features, will be equally applicable to the feature that is bilaterally symmetric about the axis "A", regardless of whether or not the symmetric feature is annotated by a reference number in the drawings.

It should also be noted that the first supply port 20, like the output conduit 26 and a return port 30 discussed below, is only partially illustrated. The port 20 is adapted to be connected to a fluid conduit (not illustrated) external to the pressure regulating microvalve 7. The manner of connection of the port 20 to the external fluid conduit is not illustrated, but may be made in any manner suitable for the desired application. For example, an extension of the cavity forming the port 20 in the second plate 16 to the edge of the second plate 16 would result in an opening being formed through the side of the pressure regulating microvalve 7 communicating with the port 20. Preferably, however, the cavity in the second plate 16 forming the port 20 will communicate with the external fluid conduit through an adjacent opening (not illustrated) through either, or both, of the first plate 14 and the third plate 18. The output conduit 26 and the return port 30 may similarly be connected to, respectively, an external hydraulic component and an external low pressure fluid reservoir, through an unillustrated extension of the respective cavity forming the output conduit 6 and the return port 30 to the edge of the second plate 16, or through unillustrated openings through the first plate 14 and the third plate 18.

More specifically, the first supply port 20 is adapted for connection through the unillustrated external fluid conduit with a "high pressure" fluid medium or fluid volume (not shown). The second plate 16 also defines a first pair of opposed ports 24 connected to an output conduit 26 for a purpose to be discussed below. The second plate 16 likewise defines a second pair of opposed ports 28 connected to a "low pressure" reservoir through the return port 30 for a purpose to be discussed below. The second plate 16 also defines a third pair of opposed ports 32 connected to the return port 30 for a purpose to be discussed below. The second plate 16 also defines a slider chamber 36 in fluid communication with the front pair of opposed ports 22, the first pair of opposed ports 24, the second pair of opposed ports 28, and the third pair of opposed ports 32 for a purpose to be discussed below.

The second plate 16 preferably also includes the following main components, each of which is a moving element of the pressure regulating microvalve 7: a slider element 40, joined to a rear arm 42 connected to a spring 44, and a buffer piston 46 attached to the slider element 40 by a front arm 48 for a purpose to be described below. These components along with the other components of the second plate 16 are described below.

The second plate 16 of the body preferably defines the following main components, each of which are stationary elements of the pressure regulating microvalve 7: a front protrusion 50 into the slider chamber 36 for engagement with the slider element 40 for opening of the pressure regulating microvalve 7 and closing the first supply port 20, a first middle protrusion 54 into the slider chamber 36 for engagement with the slider element 40 for opening and closing the first supply port 20 and the output conduit 26, a second middle protrusion 58 into the slider chamber 36, and a rear protrusion 62 into the slider chamber 36. The front protrusion 50 and the first middle protrusion 54 cooperate to define a front notch 66, the purpose of which is discussed below. The second middle protrusion 58 and the rear protrusion 62 cooperate to define a rear notch 70, the purpose of which is discussed below.

The microvalve device 5 may have gaps between the first plate 14 and/or between the third plate 18 and each of the moving elements of the second plate 16, including the slider element 40, the spring 44, and the buffer piston 46. The spring 44 is a bias means (spring element) and may be replaced by any other suitable bias means. These gaps may be formed by thinning the moving elements, i.e., the slider element 40, the spring 44, and the buffer piston 46. In addition to or in place of thinning the moving elements, these gaps may be created by forming a recess in the first plate 14 and the third plate 18 adjacent the slider element 40, the spring 44, and the buffer piston 46. The gap sizes of the gaps between the first plate 14 and the third plate 18 and the moving elements 40, 44, and 45 should be sufficiently large enough to provide free movement of the moving elements of the pressure regulating microvalve 7 without allowing excessive leakage through the pressure regulating microvalve 7 during operations in the desired service environment. In one preferred embodiment, the gaps between the stationary first plate 14 and the moving elements of the pressure regulating microvalve 7, and between the stationary third plate 18 and the moving elements of the pressure regulating microvalve 7, are approximately ten microns in size.

The microvalve device 5 will similarly have gaps between the moving elements of the second plate 16, including the slider element 40, the spring 44, and the buffer piston 46, and the stationary elements of the first plate 14 and the third plate 18. The sizes of the these gaps are great enough to permit free operation of the moving components. Those components which are not directly controlling fluid flow, such as the spring 44 may be provided with a relatively large gap, such as ten microns. The gap above and below the slider element 40 may be similar over in some non-critical areas of the slider element. Where the slider element 40 will be moved in order to close (block) ports such the front pair of opposed ports 22, the first pair of opposed ports 24, the second pair of opposed ports 28, and the third pair of opposed ports 32, the gap should be small enough to adequately restrict fluid from leaking past the slider element 40. In one preferred embodiment, gaps of approximately one micron in size are believed to be appropriate in such areas. Of course, the suitability of various gaps depend upon the service in which the microvalve is placed, such as the viscosity of the fluid passing through the microvalve, the size of solids entrained in the fluid, the acceptability of leakage through the microvalve, and the impact of inoperability of the microvalve due to inadequate clearances being provided, and gaps of at least an order of magnitude higher and lower than those described here are contemplated for both the pressure regulating microvalve 7 and the proportional microvalve 8 or other microvalve devices utilizing the inventive micromachined structure that is common to both the pressure regulating microvalve 7 and the proportional microvalve 8.

Referring still to FIG. 3, the pressure regulating microvalve 7 is illustrated in an "as-fabricated" position. The slider element 40 is movable along the longitudinal axis "A." The slider element 40 is preferably a generally quadrilateral structure which includes a first end 74 and a second end 76.

The buffer piston 46 is provided at the first end 74 of the slider element 40. It will be appreciated that the buffer piston 46 extends into an elongated recess 75. The first end 74 of the slider element 40 also preferably includes a front surface 80. The front surface 80 of the slider element 40 is preferably approximately perpendicular to the longitudinal axis "A." In a preferred embodiment, the slider element 40 includes a first protrusion 82 generally approximately perpendicular to the front surface 80 and parallel to the longitudinal axis "A." A second protrusion 84 and a rear protrusion 86 of the slider element 40 are likewise positioned generally parallel to the longitudinal axis "A" for a purpose to be described below. A first notch 88 is defined by the first protrusion 82 and the second protrusion 84 of the slider element 40.

The second end 76 of the slider element 40 is fixed to a first end 90 of the spring 44. In a preferred embodiment, the slider element 40 is spaced apart from the spring 44 by the rear arm 42. A fixed end 92 of the spring 44 is preferably fixed to the second plate 16.

In the "as-fabricated" position illustrated in FIG. 3, the slider element 40 is positioned in the slider chamber 36 by the spring 44. The spring 44 holds the slider element 40 with the front surface 80 of the slider element 40 toward a wall 96 of the slider chamber 36.

During an initial operation of the pressure regulating microvalve 7, fluid under pressure from the external pressurized fluid volume to which the first supply port 20 is connected flows from the first supply port 20 through the front conduit 21 and the front pair of opposed ports 22 into the slider chamber 36. The pressure of the fluid in the slider chamber 36 creates a force on the front surface 80 of the slider element 40, thereby urging the slider element 40 away from the wall 96.

Figure 4:
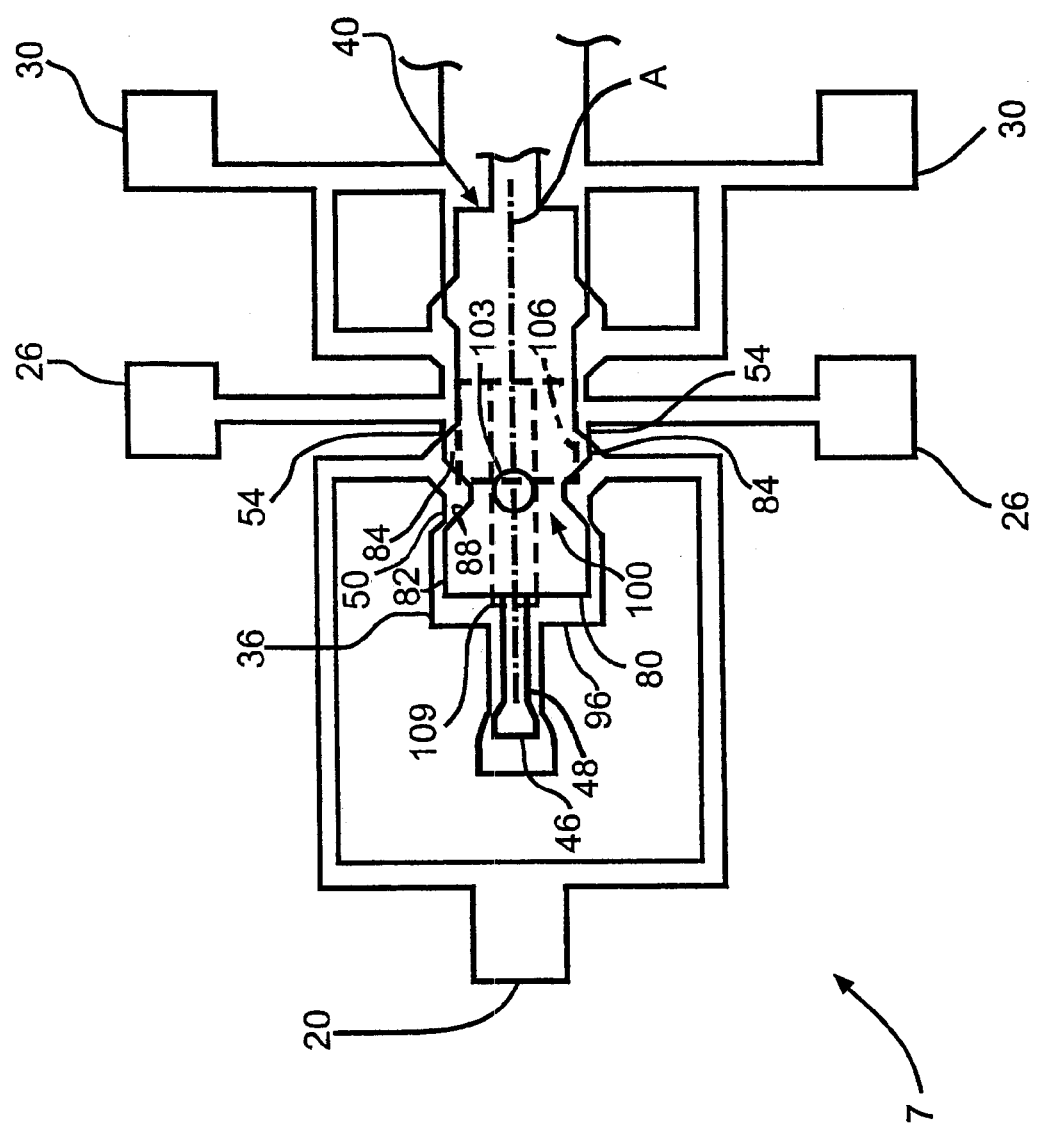
FIG. 4 is a top plan view of the pressure regulating microvalve illustrated in FIG. 1, with the first plate removed, showing the pressure regulating microvalve in a first intermediate position.

Referring now to FIG. 4, the front surface 80 of the slider element 40 of the pressure regulating microvalve 7 is shown moved away from the wall 96. The first supply port 20 is no longer in fluid communication with the output conduit 26, because the first middle protrusion 54 into the slider chamber 36 cooperates with the second protrusion 84 of the slider element 40 to block fluid flow from the front pair of opposed ports 22 into the output conduit 26. With the slider element 40 in the position illustrated in FIG. 4, the output conduit 26 remain in fluid communication with the return port 30, as was the case when the slider element 40 was in the as-fabricated position shown in FIG. 3.

The first supply port 20 remains in fluid communication with the portion of the slider chamber 36 between the wall 96 and the front surface 80 of the slider element 40. Note that the path between the first protrusion 50 into the slider chamber 36 and the first protrusion of the slider element 40 into the portion of the slider chamber 36 between the wall 96 and the front surface 80 of the slider element 40 is constricted and is ultimately shut off as the slider element 40 is displaced further rightward (as viewed in FIG. 4). However, a slider valve conduit 100 is available as an alternate flow path to the portion of the slider chamber 36 between the wall 96 and the front surface 80 of the slider element 40 when the slider element is in the position illustrated in FIG. 4 (and positions of the slider valve further rightward from the position illustrated in FIG. 4). Fluid from the first supply port 20 flows from the front pair of opposed ports 22 into the area bounded by the adjacent first notches 88 on the slider element 40. Flow enters the slider valve conduit 100 when the flow from this area flows upwardly into the corners of an overlying first recess 106 in the first plate 14 (shown in FIG. 2a). Flow from the corners of the first recess 106 then goes to the centerline of the recess, flowing over the top of the slider element 40, to a round hole 103 formed through the slider element 40. The hole 103 is in fluid communication with the first recess 106 in all positions of the slider element 40 (except the as-fabricated position, in which position fluid from the portion of the slider chamber 36 bounded by the first notches 88 is directed into the gap between the first protrusion 50 into the slider chamber 36 and the first protrusion of the slider element 40 into the portion of the slider chamber 36 between the wall 96 and the front surface 80 of the slider element 40). Flow through the slider valve conduit 100 is thence downwardly through the hole 103 in the slider element 40 into a third notch 109 in the third plate 18 (shown in FIG. 2a). The third notch 109 is elongate along the axis "A", and is in fluid communication with the hole 103 in all positions of the slider element 40. The third notch 109 also communicates with the portion of the slider chamber 36 between the wall 96 and the front surface 80 of the slider element 40 in all position of the slider element except the as-fabricated position, in which position, as discussed above, another flow path exists between the portion of the slider chamber 36 bounded by the first notches 88 and the portion of the slider chamber 36 between the wall 96 and the front surface 80 of the slider element 40. Thus, in the illustrated embodiment, the slider valve conduit 100 is made up of the first recess 106, the hole 103, and the third notch 109.

The slider valve conduit 100 provides fluid communication for the portion of the slider chamber 36 bounded by the first notches 88 to and from the portion of the slider chamber 36 between the wall 96 and the front surface 80 of the slider element 40 in all normal operating positions of the slider element 40. In a preferred embodiment, the first recess 106 and the third notch 109 are quadrilateral-shaped cavities. The first recess 106 and the third notch 109 may be any suitable shape, as may be the hole 103. The slider valve conduit 100 may also include an appropriately contoured recess (not shown) in a portion of the front arm 48 of the buffer piston 46 and/or appropriately contoured recess (not shown) in the slider element 40, rather than providing the third notch 109 or the first recess 106 (respectively) to provide a flow path between the portion of the slider chamber 36 bounded by the first notches 88 and the portion of the slider chamber 36 between the wall 96 and the front surface 80 of the slider element 40. Indeed, the slider valve conduit 100 may be formed by any suitable combination of notches, recesses, holes, or bores of any suitable shape to provide such a flow path.

Figure 5:
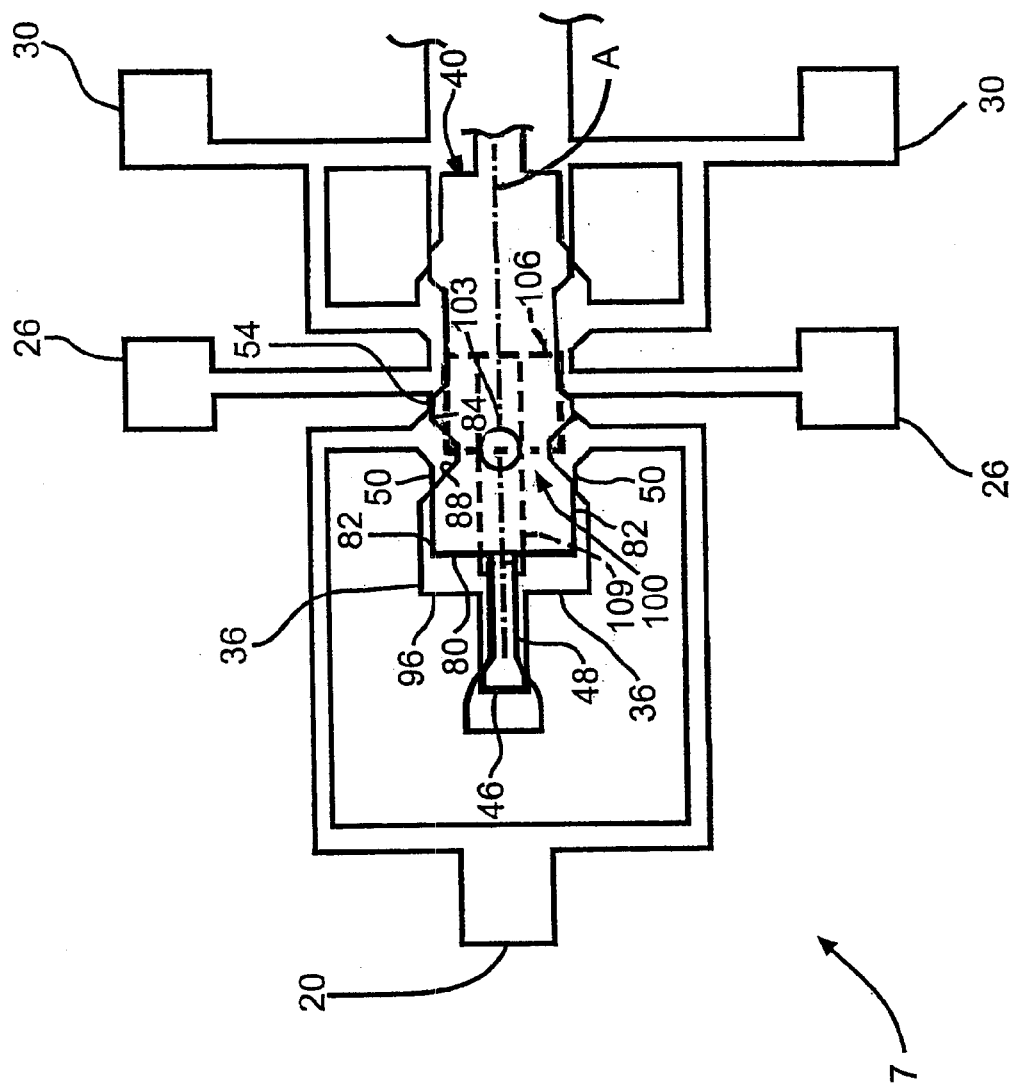
FIG. 5 is a top plan view of the pressure regulating microvalve illustrated in FIG. 1, with the first plate removed, showing the pressure regulating microvalve in a second intermediate position.

Referring now to FIG. 5, additional pressurized fluid admitted through the first supply port 20 has been directed in the portion of the slider valve chamber 36 between the wall 96 and the front surface 80 of the slider element 40 has further moved the slider element 40 of the pressure regulating microvalve 7 away from the wall 96 (rightward from the position illustrated in FIG. 4). The front protrusion 50 is now cooperating with the first protrusion 82 of the slider element 40 to substantially block all fluid flow thereby from the first supply port 20 directly to the portion of the slider valve chamber 36 between the wall 96 and the slider element 40. The first middle protrusion 54 is similarly cooperating with the second protrusion 84 of the slider element 40 to substantially block all fluid flow thereby from the first supply port 20 to the output conduit 26. However, as in FIG. 4, fluid from the first supply port 20 can be directed into the portion of the slider valve chamber 36 between the wall 96 and the front surface 80 of the slider element 40 by way of the slider valve conduit 100.

As also seen in FIG. 5, the lateral edges of the buffer piston 46 are shown engaging the adjacent stationary edges defining the elongate recess 75. This accomplishes two purposes. First, the restricted passage around the buffer piston 46 will dampen movement of the slider element 40, so that the pressure output of the pressure regulating microvalve 7 will have less rapid variability, thus helping avoid such less desirable characteristics such as "hunting" and over-correction of the fluid pressure output. Additionally, the buffer piston 46 will act as a bearing, helping keep the slider element 40 laterally centered within the slider valve chamber 36.

Figure 6:
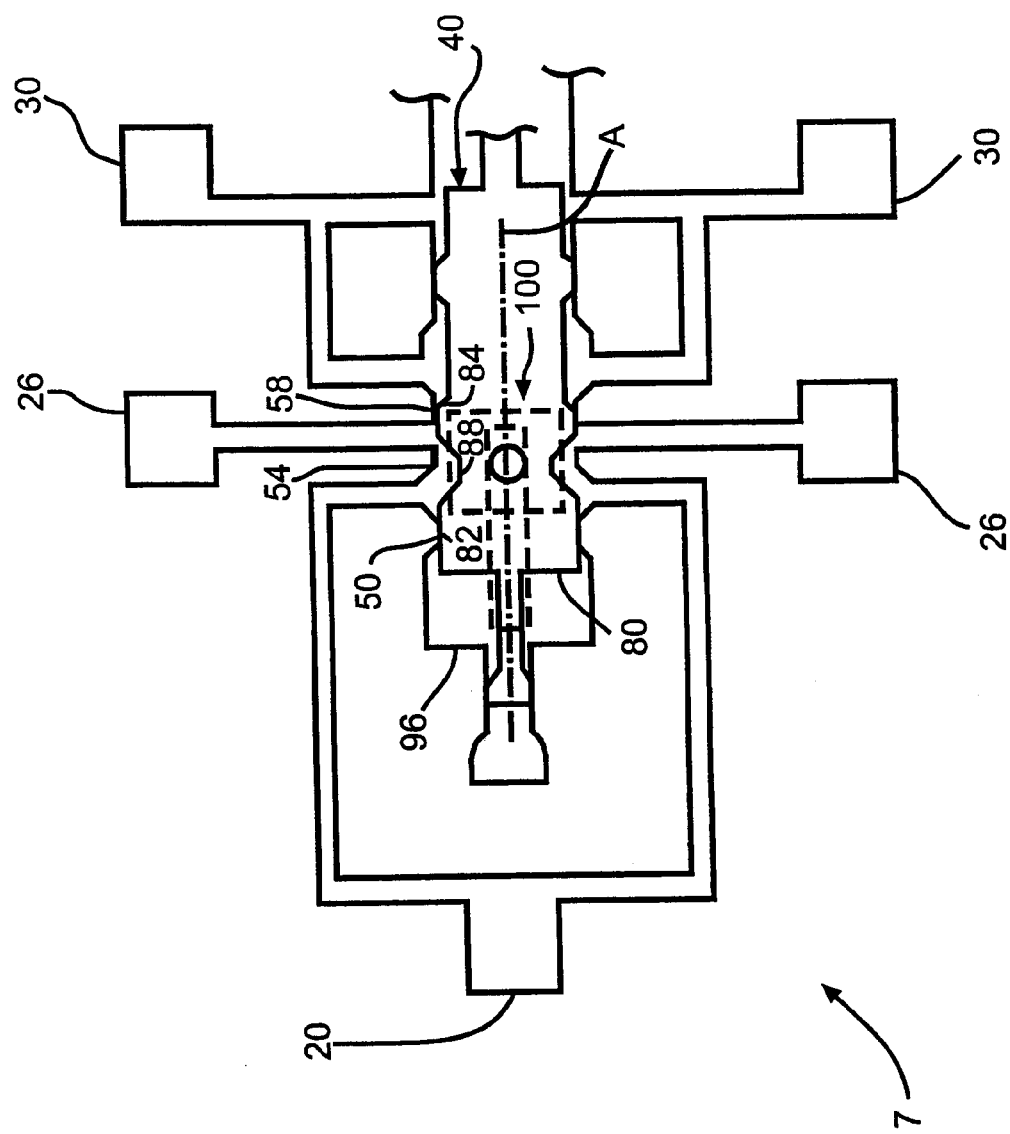
FIG. 6 is a top plan view of the pressure regulating microvalve illustrated in FIG. 1, with the first plate removed, showing the pressure regulating microvalve in a pressure increase position.

Referring now to FIG. 6, the slider element 40 is shown in a normal operating position, specifically, a pressure increase position thereof. Pressurized fluid admitted through the first supply port 20 into the region of the slider chamber 36 bounded by the first notch 88, and directed therefrom through the output conduit 26 to the load connected to the output conduit 26. The slider element 40 of the pressure regulating microvalve 7 will be in the pressure increase position when the pressure at the output conduit (and thus at the load) is less than the pressure which the pressure regulating microvalve 7 is designed to put out. As the pressure in the region of the slider chamber 36 bounded by the first notch 88 increases, which will occur as the pressure at the load increases, the pressure of the fluid in the region of the slider chamber 36 between the wall 96 and the front surface 80 of the slider element 40 will also increase, due to the communication therebetween via the slider valve conduit 100. Increased pressure in the portion of the slider valve chamber 36 between the wall 96 and the front surface 80 of the slider element 40 will further urge the slider element to move rightward (as viewed in FIG. 6).

This rightward movement of the slider element 40 increases compression in the spring 44 (shown in FIG. 3), which is developing a force opposing the rightward movement of the slider element, which force increases as the slider element moves further rightward. The compressed spring 44 urges the slider element 40 toward the wall 96.

Figure 7:
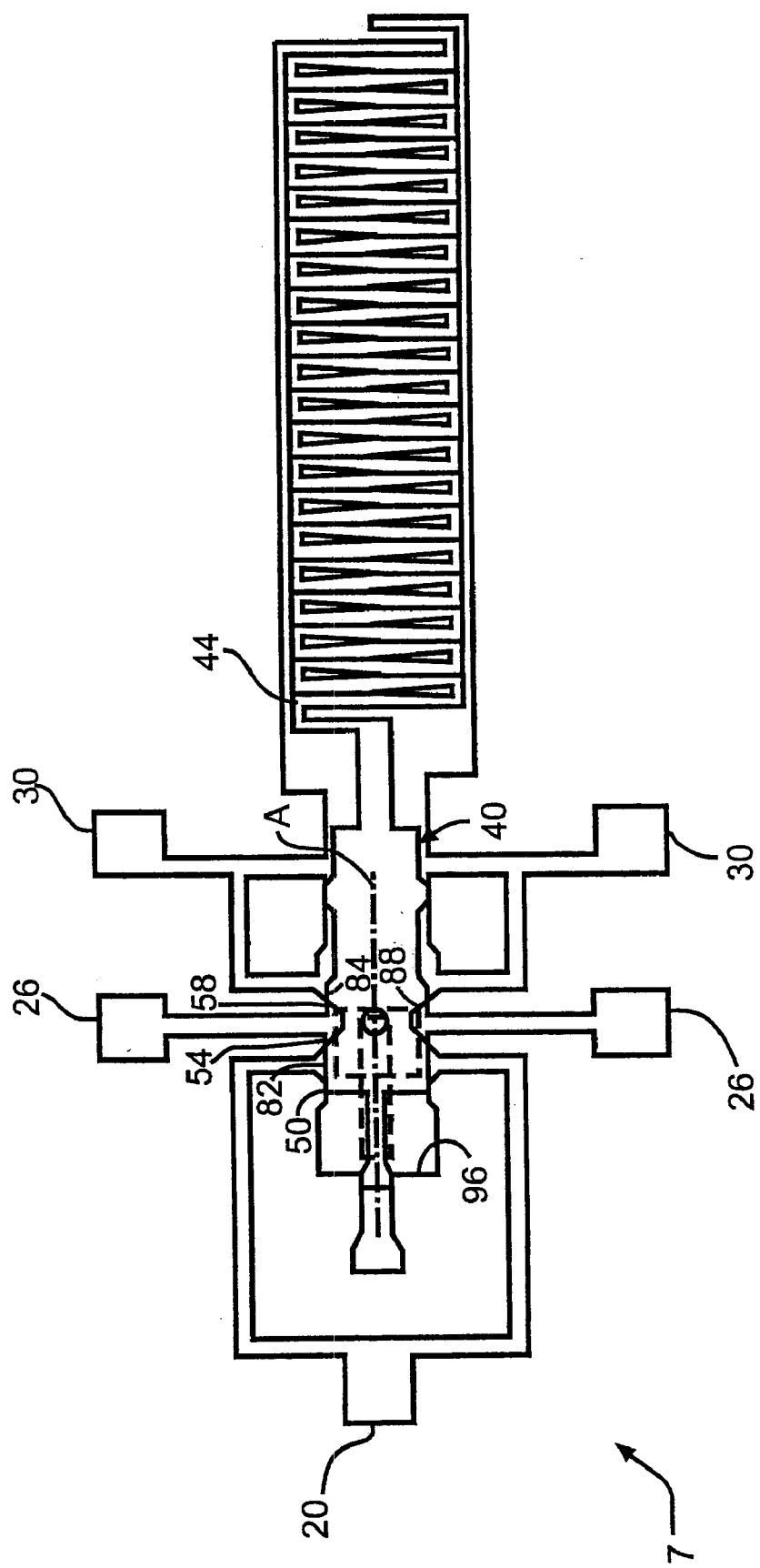
FIG. 7 is a top plan view of the pressure regulating microvalve illustrated in FIG. 1, with the first plate removed, showing the pressure regulating microvalve in a pressure hold position.

Referring now to FIG. 7, the pressure regulating microvalve 7 has reached a pressure hold position. The first supply port 20 is not in fluid communication with the output conduit 26 or the region of the slider chamber 36 bounded by the first notch 88. The front port 22 connecting the first supply port 20 to the slider chamber 36 is blocked by the slider element 40. More specifically, the front protrusion 50 cooperates with the first protrusion 82 of the slider element 40 to substantially block fluid flow thereby from the first supply port 20 to the portion of the slider chamber 36 between the wall 96 and the front surface 80 of the slider element 40. Likewise the first middle protrusion 54 cooperates with the first protrusion 82 of the slider element 40 to substantially block fluid flow thereby from the first supply port 20 to the output conduit 26. Since fluid can not flow from the first supply port 20 to the output conduit 26, the pressure in the output conduit 26 can not increase.

The output conduit 26 is also not in fluid communication with the return port 30. The second middle protrusion 58 cooperates with the second protrusion 84 of the slider element 40 to substantially block fluid flow thereby from the output conduit 26 to the return port 30. Since fluid can not flow from the output conduit 26 to the return port 30, the pressure in the output conduit 26 can not decrease.

The output conduit 26 is in fluid communication with the portion of the slider chamber 36 between the wall 96 and the front surface 80 of the slider element 40. In the pressure hold position, the forces acting on the slider element 40 are balanced; the force developed by the pressure in the region between the wall 96 and the front surface 80 acting over the area of the front surface 80 is equal to the spring force acting on the slider element 40. If the force developed by the pressure acting on the front surface 80 is less than the force exerted by the spring 44, the spring 44 will move the slider element 40 to the pressure increase position (illustrated in FIG. 6) where a flow path is opened between the first middle protrusion 54 and the first protrusion 82 of the slider element 40, allowing the pressure acting on the front surface 80 to increase until a force equilibrium is reached, and the slider element 40 is moved back to the pressure hold position. If, on the other hand, the force exerted by the spring 44 is less than the force developed by pressure acting on the front surface 80, the slider element 40 will be moved by this imbalance of forces to a pressure decrease position, described below. The slider element 40 of the pressure regulating microvalve 7 is in the pressure hold position when the pressure at the output conduit 26 is at the designed output pressure of the pressure regulating microvalve 7 and there is no fluid flow to the load connected to the output conduit 26.

Of course, if fluid from the output conduit 26 were flowing through the load, that is, if the load had significant leakage back to the reservoir connected to the return port 30 (or elsewhere), the slider valve would move leftward from the position illustrated in FIG. 7 as the outward flow of fluid decreased the pressure in the output conduit 26, lowering the pressure in the portion of the slider chamber 36 between the wall 96 and the front surface 80 of the slider element 40, and thus the rightward force acting on the slider element 40. This would re-open the connection between the first supply port 20 and the output conduit 26 (see FIG. 6) a small amount sufficient to supply the fluid flow to the output conduit 26 at the rate the fluid is flowing through the load, while restoring and maintaining the pressure in the output conduit 26 (and the portion of the slider chamber 36 between the wall 96 and the front surface 80 of the slider element 40) essentially to the designed pressure of the pressure regulating microvalve 7. While this position is termed a pressure increase position for the purposes of illustrating the invention, since the first supply port 20 and the output conduit 26 are in fluid communication, this position would be the position required to hold pressure in the output conduit 26 constant, if the load requires a continuous flow of regulated pressure fluid thereto.

Figure 8:
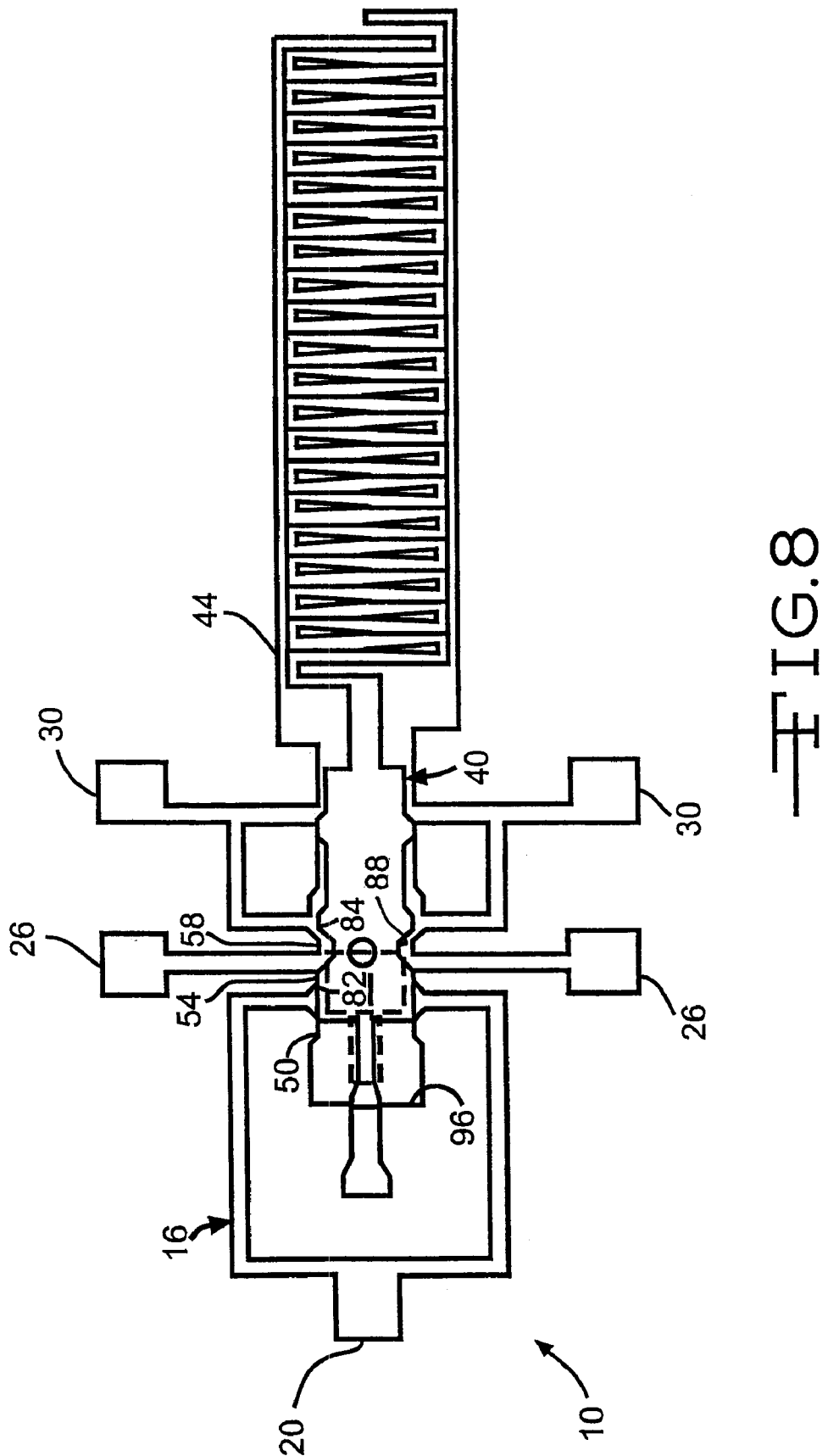
FIG. 8 is a top plan view of the pressure regulating microvalve illustrated in FIG. 1, with the first plate removed, showing the pressure regulating microvalve in a pressure decrease position.

Referring now to FIG. 8, the pressure regulating microvalve 7 is illustrated in the pressure decrease position. The first supply port 20 is blocked by the slider element 40. The output conduit 26 is in fluid communication with the return port 30 via the area of the slider chamber 36 bounded by the first notch 88, thus allowing the pressure in the output conduit 26 to decrease. The second middle protrusion 58 is spaced apart from the second protrusion 84 of the slider element 40 enough to allow fluid flow thereby from the output conduit 26 to the return port 30. It will be appreciated that the spring 44 is more compressed in the pressure decrease position than in the pressure increase position (shown in FIG. 6) or the pressure hold position (shown in FIG. 7). As the pressure in the output conduit 26 decreases (and thus the pressure in the portion of the slider chamber 36 between the wall 96 and the front surface 80 of the slider element 40), the spring 44 urges the slider element 40 toward the wall 96, returning the slider element 40 to the pressure hold position of FIG. 7 as the pressure in the output conduit 26 returns to the designed output pressure of the pressure regulating microvalve 7.

Referring again to FIG. 1, the output conduit 26 of the pressure regulating microvalve 7 is illustrated in fluid communication with the proportional microvalve 8. Referring to the detailed view of the proportional microvalve 8 in FIG. 9, the output conduit 26 is connected to a control chamber 125 of the proportional microvalve 8, via a control orifice 128.

Figure 9:
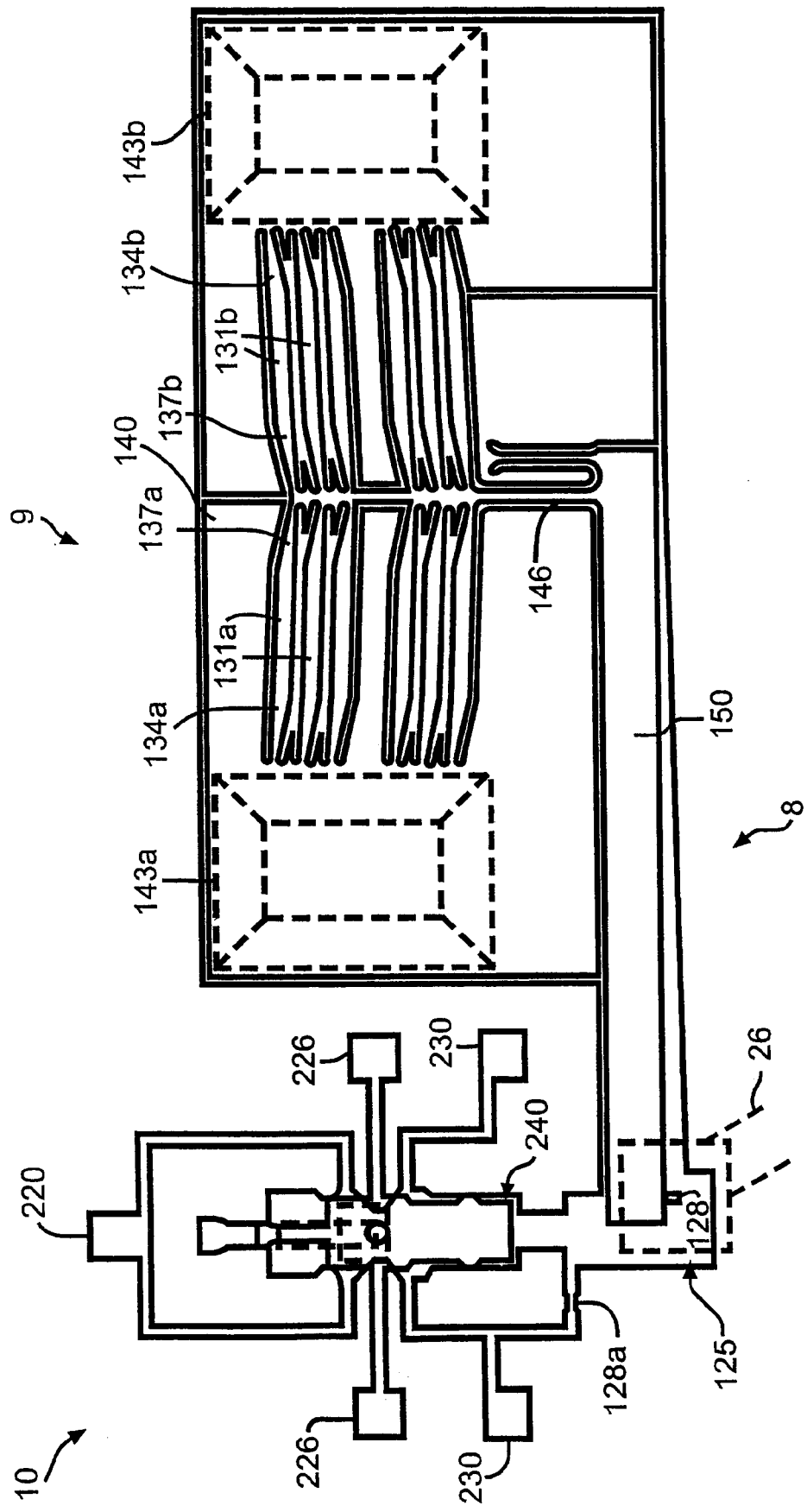
FIG. 9 is a top plan view of a proportional microvalve illustrated in FIG. 1.

As indicated above, the proportional microvalve 8 illustrated in FIG. 9 actually includes two separate valves: the pilot microvalve 9 and the pilot operated microvalve 10. The pilot microvalve 9 is a direct-acting microvalve. Devices similar in structure to the pilot microvalve 9 has been previous disclosed in U.S. patent applications having Ser. No. 09/532,604, filed Mar. 22, 2000 and Ser. No. 09/148, 026, filed Sep. 3, 1998, the disclosures of which are incorporated herein by reference. Briefly, the pilot microvalve 9 includes multiple pairs of opposing ribs 131a and 131b. Each rib 131a, 131b includes a first end 134a, 134b and a second end 137a, 137b. The first ends 134a, 134b of the ribs 131a, 131b are fixed to a fixed portion 140 adjacent the electrical contacts 143a and 143b, respectively. The second ends 137a, 137b of the ribs 131a and 131b are attached to a spine 146 at respective angles thereto. Each pair of ribs 131a and 131b are generally at an angle to one another to form a chevron having an apex at the spine 146.

When the electrical contacts 143a and 143b are electrically energized, electrical current passes between the electrical contacts 143a and 143b through the ribs 131a and 131b. In turn, the ribs 131a and 131b heat up and expand. As the ribs 131a and 131b expand, the ribs 131a and 131b elongate, which in turn causes the spine 146 to be displaced. Accordingly, it is preferable that the ribs 131a and 131b be formed from a conductor or semiconductor material having a suitable thermal expansion coefficient, such as silicon. Additionally, it is preferable that the ribs 131a and 131b, the spine 146 and the fixed portion 140 be integrally formed. By regulating the amount of current supplied through the ribs 131a and 131b, the amount of expansion of the ribs 131a and 131b can be controlled, thereby controlling the amount of displacement of the spine 146. The combination of the number of ribs 131a and 131b and the angle formed between the ribs 131a and 131b and the spine 146 is determinative of the force exerted on the spine 146 and the amount of displacement realized by the spine 146 for a given current supplied.

When displaced, the spine 146 imparts a force on the pilot microvalve 9 that produces a moment of an actuator 150. The moment causes the actuator 150 to resiliently bend from a pressure increase position, to a pressure hold position and further on to a pressure decrease position. When the electrical contacts 143a and 143b are de-energized, the ribs 131a and 131b cool and in turn contract. The contraction of the ribs 131a and 131b causes the spine 146 to be displaced in a direction opposite the direction of the displacement of the spine 146 due to the expansion of the ribs 131a and 131b, moving the actuator 150 from the pressure decrease position, back through the pressure hold position, to the pressure increase position.

In FIG. 9, the function of the spring in FIG. 7 is preferably replaced by a series pair of orifices: a "variable" control orifice 128 having a variable cross-sectional area A1, and a fixed orifice 128a having a cross-sectional area A2. The orifices 128 and 128a act like a spring of variable force so that a variable pressure may be created in the output conduit 226 (in contrast to the fixed pressure in the output conduit 26 in the pressure regulating microvalve 7 of FIG. 7). Fluid flowing from higher pressure at the inlet to the control orifice 128 ($P_s$) to lower pressure (near zero) at the outlet of the fixed orifice 128a creates a intermediate controlled pressure ($P_c$) in the cavity 125 between the orifices 128 and 128a. This intermediate controlled pressure $P_c$ is varied by varying the amount of the control orifice 128 that is covered according to the relationship:

$$P_c = P_s \times (A1^2)/(A1^2 + A2^2).$$

The intermediate controlled pressure $P_c$ will then reach and hold a value determined by the amount of the control orifice 128 that is covered, and the resultant size of the variable cross-sectional area A1 that is uncovered. This will in turn depend on the amount of electrical current supplied to the pilot microvalve ribs 131a and 131b and the resultant position of the actuator 150. Note that miniscule amounts of flow are used to create the pressure in the cavity 125 while the flow from the device (such as the proportional microvalve 8) using the intermediate controlled pressure $P_c$ may be orders of magnitude larger.

It should be recognized that pilot microvalve 9 is a variable position microvalve, and actually has an infinite number of positions, depending on the amount of electrical current supplied to the ribs 131a and 131b of the actuator 150. When no electrical current is supplied to the ribs 131a and 131b, the actuator 150 uncovers more of the control orifice 128 than in any other operating condition of the pilot microvalve 9, and the actuator 150 is in a maximum pressure position, causing the highest possible pressure in the control chamber 125. When a maximum value of electrical current is supplied to the ribs 131a and 131b, the actuator 150 moves to a minimum pressure position in which the actuator 150 covers more of the control orifice 128 than in any other operating condition of the pilot microvalve 9, causing the lowest possible pressure to exist in the control chamber 125. Moving from the maximum pressure position (no current supplied), as increasing current is supplied to the actuator 150, the actuator 150 correspondingly increasingly covers the control orifice 128. When the uncovered area of the control orifice 128 is equal to the area of the fixed orifice 128a, then the pressure in the control chamber 125 will be set at a value halfway between the maximum and minimum values. If the electrical current supplied to the actuator 150 is maintained constant, the actuator 150 will hold a fixed position and the control chamber 125 pressure will remain at a constant value, since the cross-sectional area A1 of the variable control orifice 128 will hold a fixed value, according to the above formula relating intermediate controlled pressure $P_c$ to $P_s$, A1, and A2.

Decreasing the amount of the current supplied to the actuator 150 to a lesser (but non-zero) value will cause the actuator 150 to move to increase the uncovered area of the control orifice 128, causing intermediate controlled pressure $P_c$ in the control chamber 125 to rise. Contrariwise, increasing the amount of the current supplied to the actuator 150 to a greater (but less than maximum) value will cause the actuator 150 to move to decrease the uncovered area of the control orifice 128, causing intermediate controlled pressure $P_c$ in the control chamber 125 to decrease. As will be explained below, the fluid pressure controlled by the microvalve 10 follows the pressure changes of the control chamber 125.

It should also be appreciated that the pilot microvalve 9 may be replaced by any suitable microvalve capable of opening and closing fluid ports in a proportional manner. Additionally, the actuator 150 may be replaced by any actuation means suitable for actuating the pilot microvalve 9 or an appropriate alternative microvalve. Indeed, the actuator 150 need not be a micromachined device, although it will normally be advantageous for it to be so for improved packaging and other considerations. The description regarding the pilot microvalve 9 and actuator 150 alternatives also applies to the alternative embodiments of the microvalve devices disclosed below.

Referring now to FIGS. 10 through 15, the pilot operated microvalve 10 is illustrated. The components of the pilot operated microvalve 10 and their function are in many instances identical to the pressure regulating microvalve 7 disclosed in this application. For clarity, such components will be referred to using numbers of the pressure regulating microvalve 7 plus two hundred, unless otherwise indicated. Unless otherwise indicated, where a given component is shown or discussed, its function and structure may be taken to be similar to that of the similarly numbered component of the pressure regulating microvalve 7. It should be understood that the pilot operated microvalve 10 is provided with the inventive micromachined structure (slider element and slider cavity arrangement) described above with respect to the pressure regulating microvalve. Thus, a first supply port 220 for the pilot microvalve 10 may be taken to have a generally similar structure and function to the supply port 20 in the pressure regulating microvalve 7, because the reference number 220 is two hundred greater than the reference number 20.

Figure 10:
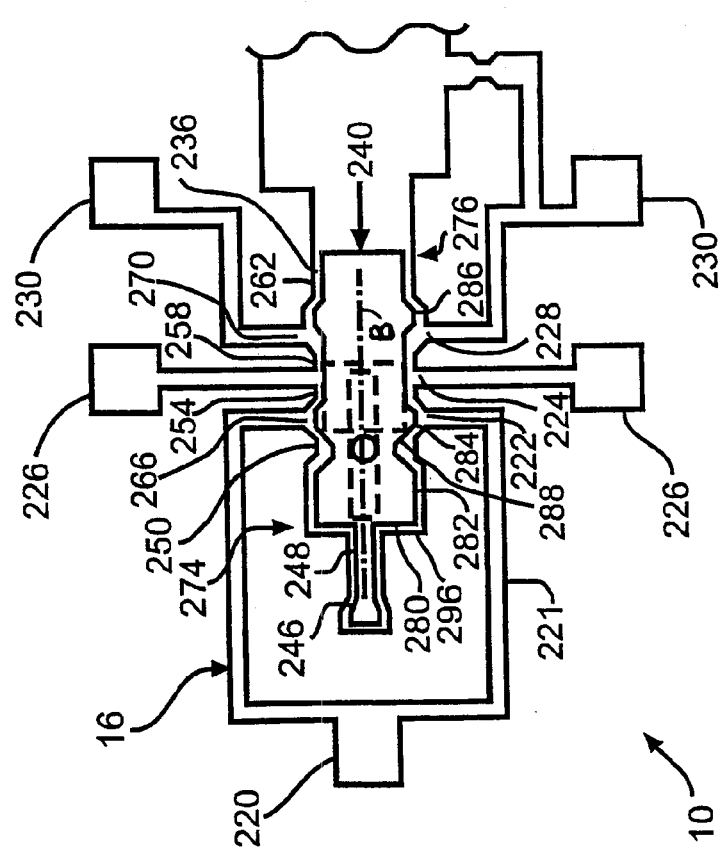
FIG. 10 is a top plan view of the pilot operated microvalve illustrated in FIG. 1, with the first plate removed, showing the pilot operated microvalve in an as-fabricated position.

Referring to the pilot operated microvalve 10 illustrated in FIG. 10, the second plate 16 defines the first supply port 220 in fluid communication with a front conduit 221 which terminates in a front pair of opposed ports 222. The first supply port 220 is adapted for connection with a "high pressure" fluid medium or fluid volume (not shown), which may be the same fluid volume that supplies the first fluid supply port 20 in the pressure regulating microvalve 7. The second plate 16 also defines a first pair of opposed ports 224 connected to an output conduit 226 for a purpose to be discussed below. The second plate 16 likewise defines a second pair of opposed ports 228 connected to a "low pressure" reservoir via the return port 230 for a purpose to be discussed below. The second plate 16 also defines a slider chamber 236 in fluid communication with the front pair of opposed ports 222, the first pair of opposed ports 224, and the second pair of opposed ports 228 for a purpose to be discussed below.

The second plate 16 preferably also includes the following main components, each of which is a moving element of the pilot operated microvalve 10: a slider element 240, and a buffer piston 246 attached to the slider element 240 by a front arm 248 for a purpose to be described below. These components along with the other components of the second plate 16 are described below.

The second plate 16 of the body preferably defines the following main components, each of which are stationary elements of the pilot operated microvalve 10: a front protrusion 250 for engagement with the slider element 240 for opening of the pilot operated microvalve 10 and closing the first supply port 220, a first middle protrusion 254 for engagement with the slider element 240 for opening and closing the first supply port 220 and the output conduit 226, a second middle protrusion 258, and a rear protrusion 262. The front protrusion 250 and the first middle protrusion 254 define a front notch 266, the purpose of which is discussed below. The second middle protrusion 258 and the rear protrusion 262 define a rear notch 270, the purpose of which is discussed below.

The pilot operated microvalve 10 may have gaps between the first and/or third plates 14, 18 and each of the moving elements of the second plate 16 including the slider element 240, and the buffer piston 246. These gaps may be formed by thinning the moving elements 240, 246 and/or by forming a recess in the first plate 14 and the third plate 18 adjacent the moving elements 240, 246. The gap sizes of the gaps between the first plate 14 and the third plate 18 and the moving elements 240, and 245 are sufficiently large enough to provide free movement of the moving elements 240, and 246. Preferably, these gaps are approximately ten microns in size.

The pilot operated microvalve 10 may also have gaps between the moving elements of the second plate 16, including the slider element 240, and the buffer piston 246, and the stationary elements recited above. The sizes of the these gaps are small enough to adequately restrict fluid from leaking past the slider element 240 when the front pair of opposed ports 222, the first pair of opposed ports 224, and the second pair of opposed ports 228 are blocked by the slider element 240. Preferably, these gaps are approximately one micron in size. As with the pressure regulating microvalve 7, the one and ten micron gap sizes discussed with respect to the pilot operated microvalve 10 are those believed to be suitable for one preferred embodiment in one application, and other gap widths may be suitable for other applications Referring still to FIG. 10, the pilot operated microvalve 10 is illustrated in an "as-fabricated" position. The slider element 240 is movable along a longitudinal axis "B" similar to the longitudinal axis "A" illustrated in FIG. 3. The slider element 240 is preferably a generally quadrilateral structure which includes a first end 274 and a second end 276.

The buffer piston 246 is provided at the first end 274 of the slider element 240. The first end 274 of the slider element 240 includes a front surface 280. The front surface 280 of the slider element 240 is preferably approximately perpendicular to the longitudinal axis "A." In a preferred embodiment, the slider element 240 includes a first protrusion 282 generally approximately perpendicular to the front surface 280 and parallel to the longitudinal axis "A." A second protrusion 284 and a rear protrusion 286 of the slider element 240 are likewise provided parallel to the longitudinal axis "B" for a purpose to be described below. A first notch 288 is defined by the first protrusion 282 and the second protrusion 284 of the slider element 240.

The second end 276 of the slider element 240 terminates at the control chamber 125 (shown in FIG. 9). Unlike the pressure regulating microvalve 7, the pilot operated microvalve 10 preferably has no spring 44 (shown in FIG. 3). In the "as-fabricated" position, the slider element 240 is positioned in the slider chamber 236 by the force produced by the intermediate controlled pressure $P_c$ in the control chamber 125 acting against the axial face of the second end 276 of the slider element 240. The force produced by the fluid in the control chamber 125 urges the front surface 280 of the slider element 240 toward a wall 296 of the second plate 16. Fluid under pressure from the first supply port 220 flows through the front conduit 221 and the front pair of opposed ports 222 into the slider chamber 236. The fluid in the slider chamber 236 creates a force on the front surface 280 of the slider element 240. When the force exerted on the slider element by the pressure of the fluid acting on the front surface 280 exceeds the force exerted in the opposite direction by the intermediate controlled pressure $P_c$ in the control chamber 125 acting against the axial face of the second end 276 of the slider element 240, the resultant net force urges the slider element 240 away from the wall 296.

Figure 11:
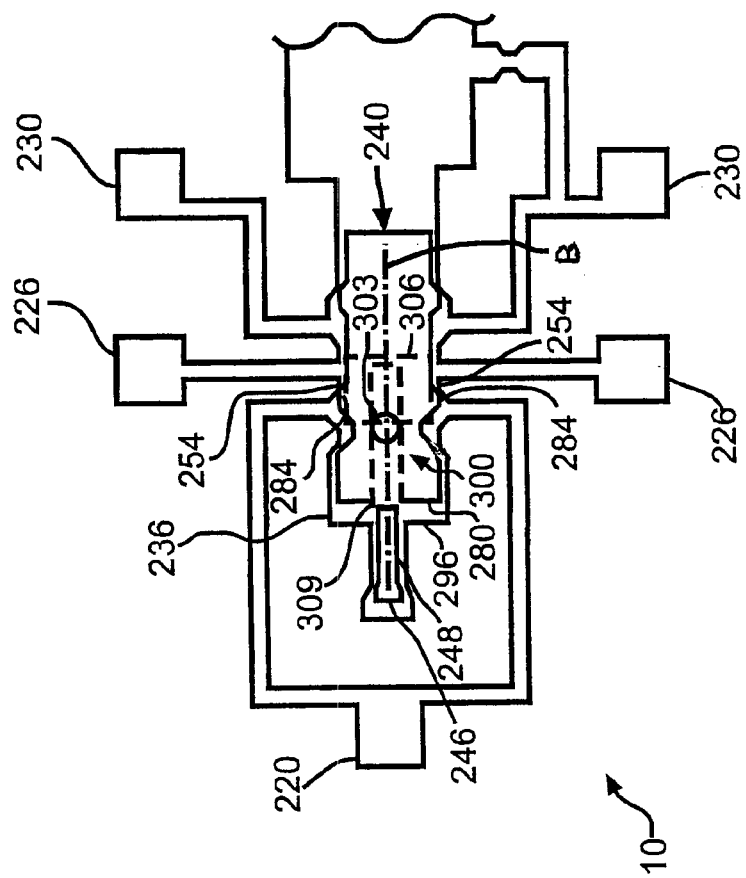
FIG. 11 is a top plan view of the pilot operated microvalve illustrated in FIG. 1, with the first plate removed, showing the pilot operated microvalve in a first intermediate position.

Referring now to FIG. 11, the front surface 280 of the slider element 240 of the pilot operated microvalve 10 has moved away from the wall 296. The first supply port 220 is no longer in fluid communication with the output conduit 226. The first middle protrusion 254 cooperates with the second protrusion 284 of the slider element 240 to substantially block fluid flow thereby. However, the first supply port 220 remains in fluid communication with the slider chamber 236.

The output conduit 226 is in fluid communication with the return port 230. Fluid from the first supply port 220 can be directed to that portion of the slider chamber 236 between the wall 296 and the front surface 280 of the slider element 240 by way of a slider valve conduit 300. The slider valve conduit 300 is formed by a round hole 303 in the slider element 240 which permits fluid to flow to and from a first recess 306 in the first plate 14 (similar to the first recess 106 shown in FIG. 2a) and a third notch 309 in the third plate 18 (similar to the third notch 109 shown in FIG. 2a). In a preferred embodiment, the first recess 306 and the third notch 309 are quadrilateral-shaped cavities. The first recess 306 and the third notch 309 may be any suitable shape, as may be the hole 303. The slider valve conduit 300 may also include an appropriately contoured recess (not shown) in a portion of the front arm 248 of the buffer piston 246 and/or appropriately contoured recess (not shown) in the slider element 240.

Referring now to FIG. 12, the slider element 240 of the pilot operated microvalve 10 has moved away from the wall 296. The first middle protrusion 254 cooperates with the second protrusion 284 of the slider element 240 to substantially block fluid flow thereby from the first supply port 220 directly to the output conduit 226. The front protrusion 250 likewise cooperates with the first protrusion 282 of the slider element 240 to restrict fluid flow thereby from the first supply port 220 directly to that portion of the slider chamber 236 between the wall 296 and the front surface 280 of the slider element 240. However, as in FIG. 11, fluid from the first supply port 220 is directed to that portion of the slider chamber 236 between the wall 296 and the front surface 280 of the slider element 240 by way of the slider valve conduit 300.

Referring now to FIG. 13, the pilot operated microvalve 10 is illustrated in a pressure increase position. The first notch 288 of the slider element 240 is spaced apart from the first middle protrusion 254, so that the first supply port 220 is in fluid communication with the output conduit 226 to raise the pressure of the fluid in the output conduit 226. The front protrusion 250 cooperates with the first protrusion 282 of the slider element 240 to substantially block fluid flow thereby from the first supply port 220 to that portion of the slider chamber 236 between the wall 296 and the front surface 280 of the slider element 240. However, fluid from the region of the slider valve chamber 236 bounded by the first notch 288 is directed to that portion of the slider chamber 236 between the wall 296 and the front surface 280 of the slider element 240 by way of the slider valve conduit 300. The second middle protrusion 258 cooperates with the second protrusion 284 of the slider element 240 to substantially block fluid flow thereby from the output conduit 226 to the return port 230. The force produced by the fluid at the intermediate control pressure $P_c$ in the control chamber 125 (shown in FIG. 9) acts against the second end 276 of the slider 240, and thus urges the front surface 280 of the slider element 240 toward the wall 296. Pressure in that portion of the slider chamber 236 between the wall 296 and the front surface 280 of the slider element 240 must act on the slider element 240 with enough force to overcome the force produced by the fluid supplied to the control chamber 125 in order to move the slider element out of the pressure increase position shown in FIG. 13 to the position shown in FIG. 14.

Referring now to FIG. 14, the pilot operated microvalve 10 has reached a pressure hold position. The first supply port 220 is not in fluid communication with the output conduit 226. Fluid communication between the slider chamber 236 and the first supply port 220 is blocked by the slider element 240. The front protrusion 250 cooperates with the first protrusion 282 of the slider element 240 to substantially block fluid flow thereby from the first supply port 220 to that portion of the slider chamber 236 between the wall 296 and the front surface 280 of the slider element 240. Likewise the first middle protrusion 254 cooperates with the first protrusion 282 of the slider element 240 to substantially block fluid flow thereby from the first supply port 220 to the output conduit 226. The output conduit 226 is blocked by the slider element 240. Since fluid can not flow from the first supply port 220 to the output conduit 226, the pressure in the output conduit 226 can not increase. The portion of the slider chamber 236 bounded by the notch 288 is still in communication with and equalizing the pressures between the output conduit 226 and that portion of the slider chamber 236 between the wall 296 and the front surface 280 of the slider element 240 (via the slider valve conduit 300).

Neither the portion of the slider chamber 236 bounded by the notch 288 nor the output conduit 226 is in fluid communication with the return port 230. The second middle protrusion 258 cooperates with the second protrusion 284 of the slider element 240 to substantially block fluid flow thereby from the output conduit 226 to the return port 230. Since fluid can not flow from the output conduit 226 to the return port 230, the pressure in the output conduit 226 can not decrease.

As indicated above, the output conduit 226 is in fluid communication with that portion of the slider chamber 236 between the wall 296 and the front surface 280 of the slider element 240 via the slider valve conduit 300. In the pressure hold position, the forces acting on the slider element 240 are balanced; the force developed by the pressure in that portion of the slider chamber 236 between the wall 296 and the front surface 280 of the slider element 240 acting over the area of the front surface 280 is equal to the force developed by the intermediate controlled pressure $P_c$ in the control chamber 125 acting on the axial face of the second end 276 of the slider element 240. If the force developed by the pressure acting on the front surface 280 is less than the force exerted by the intermediate controlled pressure $P_c$, the resultant net force will move the slider element 240 to the pressure increase position (illustrated in FIG. 13) where a flow path is opened between the first middle protrusion 254 and the first protrusion 282 of the slider element 240 and through the slider valve conduit 300, allowing the pressure acting on the front surface 280 of the slider element 240 to increase until a force equilibrium is reached, and the slider element 240 is moved back to the pressure hold position. If, on the other hand, the force developed by the intermediate controlled pressure $P_c$ in the control chamber 125 acting on the second end 276 (FIG. 10) of the slider element 240 is less than the force developed by fluid pressure acting on the front surface 280, the slider element 240 will be moved by this imbalance of forces to a pressure decrease position, described below. The slider element 240 of the pilot operated microvalve 10 is stationary in the pressure hold position when the force developed by the pressure of the fluid acting against the axial face of the second end 276 is equal to the force developed by the pressure of the fluid acting against the front surface 280. If the surface areas of the axial face of the second end 276 which is subject to the intermediate controlled pressure $P_c$ is equal to the surface area of the front surface 280 subject to pressure from the fluid in that portion of the slider chamber 236 between the wall 296 and the front surface 280 of the slider element 240, and there is no fluid flow to the load connected to the output conduit 226, the pressure in the output conduit 226 will equal the intermediate controlled pressure $P_c$. If there were a difference in the areas of the two end faces of the slider element 240, such that a ratio of the areas was other than 1:1, the pressure in the output conduit 226 would differ from the intermediate controlled pressure $P_c$ by a corresponding ratio.

Of course, if fluid from the output conduit 226 were flowing through the load, that is, if the load had significant leakage back to the reservoir connected to the return port 230 (or elsewhere), the slider valve would move leftward from the position illustrated in FIG. 14 as the outward flow of fluid decreased the pressure in the output conduit 226, lowering the pressure in the portion of the slider chamber 236 between the wall 296 and the front surface 280 of the slider element 240, and thus lowering the rightward force acting on the slider element 240. The resultant imbalance of forces would urge the slider element 226 leftward, toward the pressure increase position shown in FIG. 13. This would re-open the connection between the first supply port 220 and the output conduit 226, allowing a small amount of fluid flow sufficient to supply the fluid flow to the output conduit 226 at the rate the fluid is flowing through the load, while restoring and maintaining the pressure in the output conduit 226 (and the portion of the slider chamber 236 between the wall 296 and the front surface 280 of the slider element 240). While the position illustrated in FIG. 13 is termed a pressure increase position for the purposes of illustrating the invention, since the first supply port 220 and the output conduit 226 are in fluid communication, the position illustrated in FIG. 13 would be the position required to hold pressure in the output conduit 226 constant, if the load requires a continuous flow of regulated pressure fluid thereto.

Referring now to FIG. 15, the pilot operated microvalve 10 is illustrated in a pressure decrease position. The first supply port 220 is blocked by the slider element 240. The output conduit 226 is in fluid communication with the return port 230, thus allowing the pressure in the output conduit 226 to decrease. The second middle protrusion 258 is spaced apart the second protrusion 284 of the slider element 240 enough to allow fluid flow thereby from the output conduit 226 to the return port 230. As the pressure in the output conduit 226 decreases, the force produced by the fluid supplied to the control chamber 125 urges the slider element 240 toward the wall 296 of the second plate 16.

It should be understood that, in a preferred embodiment, the slider element 240 of the pilot operated microvalve 10 and the slider element 40 of the pressure regulating microvalve 7 can throttle between the pressure increase position and the pressure hold position in a range of pressure increase positions. Similarly, in a preferred embodiment, the slider element 240 of the pilot operated microvalve 10 and the slider element 40 of the pressure regulating microvalve 7 can throttle between the pressure decrease position and the pressure hold position in a range of pressure decrease positions.

Similar to the buffer piston 46, the lateral edges of the buffer piston 246 engage the adjacent stationary edges defining the elongate recess in which the buffer piston 246 is disposed. This will dampen movement of the slider element 240, so that the pressure in the output conduit 226 will have less rapid variability, thus helping avoid such less desirable characteristics such as "hunting" and over-correction of the fluid pressure. Additionally, the buffer piston 246 will act as a bearing, helping keep the slider element 240 laterally centered within the slider valve chamber 236.

While the first plate 14, the second plate 16, and third plate 18 have been described as being single layers of the microvalve device 5, it is contemplated that each of these plates may themselves be formed of multiple layers bonded together.

The principle and mode of operation of this invention have been described in its preferred embodiments. However, it should be noted that this invention may be practiced otherwise than as specifically illustrated and described without departing from its scope.

What is claimed is:

1. A microvalve device, comprising:
   a first plate;
   a second plate connected to said first plate, wherein said second plate defines a stationary element and contains a moveable slider element adapted move along an axis to variably and selectively restrict a flow of a fluid through the microvalve device, said slider element having a first axial face, said second plate defining a first supply port, an output conduit, and a return port, a slider conduit being defined through at least one of said first plate, said slider element of said second plate, and said stationary element of said second plate, said slider conduit providing fluid communication between said output conduit and said first axial end face, said slider element being adjustable between a pressure increase position, a pressure hold position, and a pressure decrease position, wherein said pressure increase position of said slider element puts said first supply port in fluid communication with said output conduit, wherein said pressure hold position of said slider element isolates said output conduit from fluid communication with first supply port and said return port, and wherein said pressure decrease position puts said output conduit in fluid communication with said return port; and a third plate connected to said second plate and cooperating with said first plate and said second plate to define a cavity containing said slider element.

2. The microvalve device of claim 1 wherein the operation of said slider element is responsive to a control signal.

3. The microvalve device of claim 2 wherein said slider element has a second axial face at an opposite end from said first axial face, and said control signal is a variable fluid pressure acting against said second axial face, said slider element selectively moving between said pressure increase position, said pressure hold position, and said pressure decrease position to regulate a fluid pressure in said output conduit to be proportionate to said control signal.

4. The microvalve device of claim 3, further including a pilot microvalve controlling said control signal.

5. The microvalve device of claim 4, wherein said pilot microvalve includes an actuator disposed in said second plate, at least one of said first, second, and third plates defining a control orifice adapted to be connected to a supply of pressurized fluid, said actuator selectively covering and uncovering said control orifice to modulate said control signal.

6. The microvalve device of claim 5, wherein said second plate defines a control chamber and a fixed orifice providing fluid communication between said control chamber and said return port, said second axial face of said slider element being in fluid communication with said control chamber.

7. The microvalve device of claim 1 wherein said second plate includes a spring operatively connected to said slider element.

8. A microvalve device comprising:

a first plate;

a second plate is connected to said first plate, wherein said second plate contains a slider element and a stationary element, said stationary element defining a slider chamber, a supply port in fluid communication with said slider chamber, an output conduit in fluid communication with said slider chamber, and a return port in fluid communication with said slider chamber, said slider element defining a longitudinal axis and having an axial first end and an axial second end, said slider element further comprising a laterally extending first protrusion at said first end of said slider element, a laterally extending second protrusion at said second end of said slider element and a laterally extending middle protrusion disposed between and spaced apart from said first protrusion and said second protrusion, said first protrusion and said middle protrusion cooperating to define a first notch therebetween, said middle protrusion and said second protrusion cooperating to define a second notch therebetween, said slider element being disposed within said slider chamber, said slider element being movable along said longitudinal axis within said slider chamber to selectively block the flow of a fluid which may be supplied to the microvalve device though said supply port, said output conduit, and said return port; and a third plate connected to said second plate, said first plate, said second plate, and said third plate cooperating to define a body of said microvalve device.

9. The microvalve device of claim 8 wherein said slider element defines a front surface at said first end of said slider element, said body defining a slider conduit providing fluid communication between said output conduit and a portion of said slider chamber adjacent said front surface.

10. The microvalve device of claim 9 further comprising a spring connected to said slider element to urge said slider toward a position in which said first notch enables fluid communication between said supply port and said output conduit, said spring exerting a force on said slider element which acts in opposition to any force generated by a pressure of a fluid which may be introduced into said slider chamber adjacent said front surface.

11. The microvalve device of claim 9 wherein said second end of said slider element and said body cooperate to define a control chamber, said body defining a port in fluid communication with said control chamber through which a fluid can be introduced, the pressure of the fluid generating a force urging said slider toward a position in which said first notch enables fluid communication between said supply port and said output conduit, said pressure generated force acting on said second end of said slider element acting in opposition to any force generated by a pressure of a fluid which may be introduced into said slider chamber adjacent said front surface.

12. A pressure regulating microvalve for regulating the flow of a fluid comprising:

a stationary element that defines a central cavity in fluid communication with a supply port, an output conduit, and a return port; and a mobile element, being movable along a longitudinal axis, said mobile element including a spring operatively connected to a slider element positioned within said central cavity, said slider element being mounted for movement along said longitudinal axis and adapted to selectively block the flow of a fluid supplied to said pressure regulating microvalve through said supply port, said output conduit, and said return port.

13. The pressure regulating microvalve of claim 12 wherein said stationary element further includes an elongated recess along said longitudinal axis and said mobile element further includes a buffer piston operatively connected to said slider element, wherein said buffer piston extends into said elongated recess to support reciprocal movement of said mobile element.

14. The pressure regulating microvalve of claim 12 wherein said mobile element defines a hole through said mobile element perpendicular to a plane of movement of said mobile element.

15. The pressure regulating microvalve of claim 14 wherein said hole in said mobile element is in fluid communication with said output conduit and forms a portion of a slider conduit providing fluid communication between said output conduit and an axial face of an end of said slider element which is opposite an end of said slider element to which said spring is connected.

16. The pressure regulating microvalve of claim 15 wherein said mobile element is configured for movement between a pressure increase position in which said slider element permits fluid communication between said supply port and said output conduit, a pressure hold position in which said output conduit is substantially isolated from said supply port and said return port, and a pressure decrease position in which said slider element permits fluid communication between said output conduit and said return port.

17. The pressure regulating microvalve of claim 12 wherein said mobile element defined in a plate.

18. The pressure regulating microvalve of claim 12 wherein said slider element forms the moving portion of a plate valve.

19. The pressure regulating microvalve of claim 12 wherein said stationary element and said mobile element are defined in a single plate.

20. The pressure regulating microvalve of claim 19, further including two additional plates on either side of said single plate, said two additional plates cooperating with said stationary element to define said central cavity.

21. The pressure regulating microvalve of claim 12, further comprising:
a pilot microvalve including a control chamber defined therein, a control orifice providing fluid communication between said output conduit and said control chamber, an actuator selectively and variably covering said control orifice to control a flow of fluid from said output conduit to said control chamber, and a fixed orifice providing fluid communication between said fluid chamber and a second return port; and
a pilot operated microvalve including a second central cavity defined therein and a second slider element positioned within said second central cavity, said second slider element being mounted for movement along a second longitudinal axis and adapted to selectively block the flow of a fluid supplied to said pilot operated microvalve through a second supply port, a second output conduit, and a second return port, said second slider element having a first end face and a second end face, said pilot operated microvalve further having a slider conduit defined therein providing fluid communication between said second output conduit and said first end face of said second slider element, said control chamber being in fluid communication with said second end face of said second slider element, whereby pressure in said second output conduit is proportional to a pressure in said control chamber, the pressure in said control chamber being varied by varying the amount of said control orifice that is covered by said actuator of said pilot microvalve according to the relationship $$P_c = P_s \times (A1^2)/(A1^2 + A2^2)$$

where $P_c$ is the pressure in the control chamber, $P_s$ is the pressure of the fluid supplied to the control orifice from said output conduit, $A_1$ is the cross-sectional area of the control orifice that is unblocked by said actuator of said pilot microvalve, and $A_2$ is the cross-sectional area of said fixed orifice.

22. A microvalve device comprising:
a stationary element that defines a central cavity, said central cavity being in fluid communication with a supply port, an output conduit, a return port, and a control chamber; and
a slider element disposed in said central cavity, said slider element having a first end face and a second end face, said first end face being in fluid communication with said output conduit, said second end face being in fluid communication with said control chamber, said slider element being positioned by a force generated by pressure against said first end face acting in opposition to a force generated by pressure against said second end face, said slider element thus being variably controlled to move between a pressure increase position in which said slider element permits fluid communication between said supply port and said output conduit, a pressure hold position in which said output conduit is substantially isolated from said supply port and said return port, and a pressure decrease position in which said slider element permits fluid communication between said output conduit and said return port.

23. The microvalve device of claim 22 wherein said slider element moves along a longitudinal axis, the microvalve device further comprising a bearing means for laterally positioning said pressure-regulating means within said central cavity.

24. The microvalve device of claim 23 wherein said bearing means further comprises a damping piston disposed in an longitudinally elongate recess.

25. The microvalve device of claim 22 further comprising a means for controlling the pressure in said control chamber.

26. The microvalve device of claim 22 further comprising a direct acting thermally actuated pilot microvalve, said pilot microvalve being responsive to an electrical signal to selectively and variably block and uncover a control orifice through which pressurized fluid may be supplied to said control chamber.

27. The microvalve device of claim 26 further comprising a fixed orifice providing fluid communication between said control chamber and said return port.

28. The microvalve device of claim 27 wherein the pressure in said control chamber is varied by varying the amount of said control orifice that is covered according to the relationship $$P_c = P_s \times (A1^2)/(A1^2 + A2^2)$$

where $P_c$ is the pressure in said control chamber, $P_s$ is the pressure of the fluid supplied to said control orifice, $A_1$ is the cross-sectional area of said control orifice that is unblocked by said pilot microvalve, and $A_2$ is the cross-sectional area of said fixed orifice.

29. A microvalve for regulating the flow of a fluid comprising:
a stationary element that defines a central cavity in fluid communication with a supply port, an output conduit, and a return port; and
a mobile element, being positioned along a longitudinal axis, that includes a resilient member operatively connected to a slider element positioned within said central cavity, said slider element having a first protrusion, a second protrusion spaced apart from said first protrusion, a rear protrusion spaced apart from said second protrusion, and a front surface adjacent to said first protrusion,
wherein said mobile element is mounted for movement to selectively block the flow of the fluid from said supply port, said output conduit, and said return port of said microvalve.

30. The microvalve of claim 29 wherein said mobile element is integrally formed with said stationary element.

31. The microvalve of claim 29 wherein said mobile element is formed separately from said stationary element.

32. The microvalve of claim 29 wherein said resilient member includes a spring.

33. The microvalve of claim 29 wherein said stationary element is included in a plate.

34. The microvalve of claim 29 wherein said mobile element is included in a plate.

35. The microvalve of claim 29 wherein said stationary element further includes an elongated recess positioned along said longitudinal axis and said mobile element further includes a buffer piston operatively connected to said slider element, wherein said buffer piston extends into said elongated recess to support reciprocal movement of said mobile element.

36. The microvalve of claim 29 wherein said stationary element cooperates with said mobile element to define a chamber configured to receive the flow of the fluid and said front surface is configured for reciprocal movement in response to the flow of the fluid.

37. The microvalve of claim 29 wherein said mobile element defines a hole through said mobile element.

38. The pressure regulating microvalve of claim 37 wherein said hole in said mobile element is in fluid communication with said output conduit.

39. A microvalve device including
   a housing defining a stationary element, a first supply port, an output conduit, a return port; and
   a moveable plate valve slider element disposed in said housing, said slider element in a pressure increase position allowing fluid to flow from said first supply port to said output conduit, said slider element in a pressure hold position isolating said output conduit from both said first supply port and said return port, said slider element in a pressure decrease position allowing fluid to flow from said output conduit to said return port, said positioning of said slider element being a result of a balancing of forces acting against opposed axial ends of said slider element.

40. The microvalve device of claim 39 wherein said microvalve device is formed from three plates.

41. The microvalve device of claim 39 wherein a first axial end face of said slider element is adapted to be exposed to fluid pressure from said output conduit, said slider element having a second axial end face opposite said first axial end face, said second axial end face being acted upon by a spring, with the position of said slider element being determined by a balancing of a force exerted by said spring and a force exerted by fluid pressure acting against said first axial end face.

42. The microvalve device of claim 39 wherein a first axial end face of said slider element is adapted to be exposed to fluid pressure from said output conduit, said slider element having a second axial end face opposite said first axial end face, said second axial end face of said slider element being adapted to be acted upon by a pressurized fluid, with the position of said slider element being determined by a balancing of forces exerted by fluid pressure acting against said first axial end face and exerted by fluid pressure acting against said second axial end face.

43. The microvalve device of claim 39 further including a buffer piston extending axially from an axial end face of said slider element.

* * * * *

UNITED STATES PATENT AND TRADEMARK OFFICE
CERTIFICATE OF CORRECTION

PATENT NO.     : 6,694,998 B1
DATED          : February 24, 2004
INVENTOR(S)    : Harry A. Hunnicutt It is certified that error appears in the above-identified patent and that said Letters Patent is hereby corrected as shown below:

Column 21,
Line 16, delete the second occurrence of "fluid" and insert -- control --;
Line 25, delete "a" and insert -- said --.

Signed and Sealed this

Twenty-second Day of June, 2004

JON W. DUDAS
*Acting Director of the United States Patent and Trademark Office*